(12) United States Patent
Hasegawa

(10) Patent No.: US 7,589,739 B2
(45) Date of Patent: Sep. 15, 2009

(54) COLOR EVALUATING METHOD OF IMAGE DISPLAY DEVICE

(75) Inventor: Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 407 days.

(21) Appl. No.: 11/462,758

(22) Filed: Aug. 7, 2006

(65) Prior Publication Data

US 2007/0035556 A1 Feb. 15, 2007

(30) Foreign Application Priority Data

Aug. 11, 2005 (JP) .............................. 2005-232869
Jul. 12, 2006 (JP) .............................. 2006-191081

(51) Int. Cl.
*G09G 5/00* (2006.01)
*G09G 5/02* (2006.01)
*H04N 5/46* (2006.01)
*H04N 5/21* (2006.01)
*H04N 5/70* (2006.01)
*G03F 1/46* (2006.01)
*G06K 9/00* (2006.01)

(52) U.S. Cl. ........................ 345/581; 345/589; 345/591; 345/593; 345/594; 358/518; 358/519; 382/162; 382/165; 382/167; 434/98; 348/557; 348/630; 348/799

(58) Field of Classification Search .................. 345/581, 345/589, 593–594, 597, 600–601, 591, 618; 382/162–170; 358/515–521; 434/81, 98; 715/810, 835; 348/71, 101, 514, 519, 557, 348/562, 624, 630, 799, 803

See application file for complete search history.

(56) References Cited

U.S. PATENT DOCUMENTS

| | | | | |
|---|---|---|---|---|
| 5,483,259 A | * | 1/1996 | Sachs | 345/600 |
| 6,122,391 A | * | 9/2000 | Ringland et al. | 382/100 |
| 2002/0122019 A1 | * | 9/2002 | Baba et al. | 345/88 |
| 2002/0169805 A1 | * | 11/2002 | Edge | 707/528 |
| 2003/0122771 A1 | * | 7/2003 | Sumiyoshi et al. | 345/102 |
| 2003/0174882 A1 | * | 9/2003 | Turpin et al. | 382/162 |
| 2004/0227964 A1 | * | 11/2004 | Fujino | 358/1.9 |
| 2005/0207667 A1 | * | 9/2005 | Shiraishi | 382/245 |
| 2006/0022994 A1 | * | 2/2006 | Hussie | 345/591 |
| 2006/0209000 A1 | * | 9/2006 | Sumiyoshi et al. | 345/102 |

FOREIGN PATENT DOCUMENTS

| | | |
|---|---|---|
| JP | A-06-217239 | 8/1994 |
| JP | A-10-002800 | 1/1998 |
| JP | A-2002-323376 | 11/2002 |

* cited by examiner

*Primary Examiner*—Wesner Sajous
(74) *Attorney, Agent, or Firm*—Oliff & Berridge, PLC

(57) ABSTRACT

There is provided a color evaluating method of an image display device, which evaluates colors displayed by the image display device, including: displaying an image evaluation image, in which a plurality of color regions corresponding to a pixel or a plurality of pixels of the image display device and each having one of a plurality of colors is included and, among the plurality of color regions, at least one color region and at least one other color region having a color similar to that of the one color region are arranged to be adjacent to each other, on the image display device; and evaluating the colors displayed by the image display device based on picked-up image data obtained by picking up the color evaluation image displayed by the image display device.

10 Claims, 15 Drawing Sheets

EXAMPLE OF PROGRAM OF TRACING THREE-DIMENSIONAL COLOR COORDINATES
ALONG HILBERT CURVE AND OUTPUTTING COLOR
COORDINATES ONE BY ONE (PORTION)

```
static const int R3D[8][9] = {
    {0,1,0,1,0,0,0,0,1},

{0,0,1,0,1,0,1,0,0},
    {0,0,1,0,1,0,1,0,0},

{1,0,0,0,-1,0,0,0,-1},
    {1,0,0,0,-1,0,0,0,-1},

{0,0,-1,0,1,0,-1,0,0},
    {0,0,-1,0,1,0,-1,0,0},

{0,-1,0,-1,0,0,0,0,1}
};
static const int Mov[7][3] = {
    {0,1,0},
    {0,0,1},
    {0,-1,0},

{1,0,0},

{0,1,0},
    {0,0,-1},
    {0,-1,0}
};

static void DrawStep( int Vect[3] )
{
    int n;
    n = Valid;
    Pos[n+1][0] = Pos[n][0]+(unsigned char)Vect[0];
    Pos[n+1][1] = Pos[n][1]+(unsigned char)Vect[1];
    Pos[n+1][2] = Pos[n][2]+(unsigned char)Vect[2];
    Valid++;
} static void DrawUnit( const int Mat[9],int level )
{
    int i;
    int NextMat[9];
    int Vec[3];

if( level < 1 )return;

for( i = 0; i < 7; i++ ){
        MatMlt(Mat,R3D[i],NextMat);      // PRODUCT OF MATRIX
        DrawUnit(NextMat,level-1);        // RECURSION
        VecMlt(Mat,Mov[i],Vec);           // PRODUCT OF MATRIX AND VECTOR
        DrawStep(Vec);                    // WRITING OF ONE COLOR COORDINATE
    }
    MatMlt(Mat,R3D[7],NextMat);           // PRODUCT OF MATRIX
    DrawUnit(NextMat,level-1);            // RECURSION
}
```

FIG.16

COLOR EVALUATING METHOD OF IMAGE DISPLAY DEVICE

BACKGROUND

1. Technical Field

The present invention relates to a color evaluating method of an image display device, which evaluates colors displayed by the image display device, a color evaluating program of an image display device, a color evaluating device of an image display device, color evaluation image data used when evaluating colors displayed by an image display device, a color evaluation image data generating program for generating color evaluation image data, a color adjusting method of an image display device, which adjusts colors displayed by the image display device, a color adjusting device of an image display device, and an image display device.

2. Related Art

Recently, image display devices having high performance, such as a large-screen television set and so on, are widely used. These image display devices require higher color reproducibility.

Accordingly, the digitalization of an image signal is further developed, and thus an image display device having higher color resolution, in which colors RGB are formed of 8 bits to 10 bits or 12 bits, respectively, when the colors of pixels on a screen are represented by digital data, is introduced.

In the image display device having the higher color resolution, in order to display preferable colors and accurate colors, evaluation of the color reproducibility of the image display device, for evaluating which colors are actually displayed on a screen by image data input by the image display device, is of importance.

Various technologies for evaluating the color reproducibility of the image display device (hereinafter, referred to as color evaluation) have been suggested (for example, see JP-A-10-2800, JP-A-6-217239 and JP-A-2002-323376).

In technologies disclosed in JP-A-10-2800 and JP-A-6-217239, a specific color, that is, a single color, is displayed on an entire screen and is measured by a camera or a luminance meter, thereby performing the color evaluation. That is, in the technologies disclosed in JP-A-10-2800 and JP-A-6-217239, the color evaluation is performed for each color.

In the technology disclosed in JP-A-2002-323376, the color evaluation is performed with higher precision by performing highly accurate measurement compared with JP-A-10-2800 and JP-A-6-217239. In the technology disclosed in JP-A-2002-323376, a specific color displayed by a projector which is an image display device is precisely measured using a camera and a spectral distribution measuring device and the color evaluation is performed for each color, similar to JP-A-10-2800 and JP-A-6-217239.

However, as described above, since the resolution of a color space of the recent image display device is very high, in order to obtain the result of evaluating as many colors as possible among colors which can be displayed by the image display device in a method of performing the color evaluation for each color, the colors must be repeatedly displayed and the color evaluation must be performed for each color. Accordingly, it takes much time to evaluate the color. In order to reduce the time required for evaluating the color, interpolation is executed from discrete color evaluation data to generate color evaluation data on color except an evaluation target. Since there is a high possibility that the color evaluation data obtained by the interpolation becomes an estimated value, sufficient precision is not obtained in all color regions.

In order to solve this problem, it is preferable that as many colors as possible are simultaneously displayed on a screen and simultaneously evaluated. Accordingly, it is possible to efficiently perform the color evaluation with high precision.

However, an optical modulating element used in the image display device, and more particularly, an optical modulating element for controlling pixels in a matrix method may be influenced by signals input to peripheral pixels to perform an unpreferable operation. An optical modulating element for performing the unpreferable operation may, for example, use liquid crystal. When the optical modulating element uses the liquid crystal, a single color signal is often applied to the entire screen to improve the precision of the color evaluation, like the technologies disclosed in JP-A-10-2800, JP-A-6-217239 and JP-A-2002-323376.

SUMMARY

Accordingly, an advantage of the invention is to provide a color evaluating method of an image display device, which is capable of efficiently evaluating colors displayed by the image display device with high precision, a color evaluating program of an image display device, a color evaluating device of an image display device, color evaluation image data used when evaluating colors displayed by an image display device, and a color evaluation image data generating program for generating color evaluation image data. Another advantage of the invention is to provide a color adjusting method of an image display device, which is capable of efficiently adjusting colors displayed by the image display device, a color adjusting device of an image display device, and an image display device which is capable of performing high-precision color adjustment for a short time.

According to a first aspect of the invention, there is provided a color evaluating method of an image display device, which evaluates colors displayed by the image display device, including: displaying an image evaluation image, in which a plurality of color regions corresponding to a pixel or a plurality of pixels of the image display device and each having one of a plurality of colors is included and, among the plurality of color regions, at least one color region and at least one other color region having a color similar to that of the one color region are arranged to be adjacent to each other, on the image display device; and evaluating the colors displayed by the image display device based on picked-up image data obtained by picking up the color evaluation image displayed by the image display device.

According to the color evaluating method of the image display device according to the aspect of the invention, it is possible to efficiently evaluate the colors displayed by the image display device. The image evaluation image has an arrangement in which the plurality of color regions corresponding to the pixels of the image display device and each having one of the plurality of colors is included and, among the plurality of color regions, at least one color region and at least one other color region having a color similar to that of the one color region are arranged to be adjacent to each other. By using the color evaluation image having the arrangement of the color regions, it is possible to excellent effect when an optical modulating element (for example, liquid crystal) for controlling the pixels in a matrix method is used. That is, by using the color evaluation image having the arrangement in which, among the plurality of colors, the color regions having similar colors are adjacent to each other in at least a portion thereof, the number of adjacent pixels having significantly different signal values is reduced. Accordingly, when the optical modulating element (for example, liquid crystal) for controlling the pixels in the matrix method is used, it is possible to reduce the problem that the signal value of any pixel is apt to be influenced by the signal values of the adjacent pixels.

The pixel of the image display device includes the pixel of the optical modulating element, the pixel of a self-emission type element, and the pixel of an image display device for displaying an image for each pixel based on image data.

It is preferable that the color evaluation image has a color arrangement in which the plurality of color regions are arranged in a lattice shape and, among the plurality of color regions, in at least a given color region except a color region located at the end of the color evaluation image, two of color regions adjacent to the given color region have colors similar to that of the given color region.

Since the color evaluation image has the above-described arrangement of the color regions, it is possible to display colors closer to a plurality of colors which can be displayed by the color resolution of the image display device. By using the color evaluation image having the above-described arrangement of the color regions, it is possible to evaluate a plurality of colors which can be displayed by the image display device only by displaying the color evaluation image once. Since the number of adjacent pixels having significantly different signal values is reduced, it is possible to reduce the problem that the signal value of any pixel is apt to be influenced by the signal values of the adjacent pixels when the optical modulating element (for example, liquid crystal) for controlling the pixels in the matrix method is used.

It is preferable that the color evaluation image has a color arrangement in which the plurality of color regions are arranged in a belt shape, long sides of the belt-shaped color regions are arranged to be adjacent to one another and, among the plurality of color regions, in at least a given color region except a color region located at the end of the color evaluation image, two color regions adjacent to the given color region have colors similar to that of the given color region.

In this case, in the color evaluation image, the color regions are arranged in the belt shape and two of adjacent color regions have the similar colors. Since the color regions having the respective colors in the image evaluation image are arranged in the belt shape, the color evaluation image is preferably used when performing position adjustment for color matching of a plurality of display images at the time of tiling display or stacking display in a projector.

In this case, in the color evaluation image, the color regions having respective colors are arranged in the belt shape and two of adjacent color regions have the similar colors. Accordingly, when the optical modulating element (for example, liquid crystal) for controlling the pixels in the matrix method is used, the signal values applied to pixels adjacent to any pixel in four directions or eight directions are equal or substantially equal to one another. Thus, when the optical modulating element (for example, liquid crystal) for controlling the pixels in the matrix method is used, it is possible to reduce the problem that the signal value of any pixel is apt to be influenced by the signal values of the adjacent pixels.

It is preferable that the color of the given color region is the color of a predetermined point among points in a color space obtained by quantizing an n-dimensional (n is an integer of at least 3) color space, and the similar colors are the colors of points adjacent to the predetermined point in the color arrangement when the points in the color space are arranged in a predetermined space-filling curve.

Since the color evaluation image has the above-described configuration, it is possible to properly evaluate the colors using the color evaluating method of the image display device according to the first aspect of the invention.

It is preferable that the predetermined space-filling curve is a fractal curve.

By this configuration, it is possible to generate the color evaluation image used in the color evaluating method of the image display device.

It is preferable that the fractal curve is a Hilbert curve.

By using the Hilbert curve as the fractal curve, it is possible to generate the color evaluation image used in the color evaluating method of the image display device.

It is preferable that the evaluating of the color includes comparing color evaluation image data corresponding to the color evaluation image with the picked-up image data to evaluate the colors displayed by the image display device.

By performing the above-described process, it is possible to evaluate whether the colors displayed by the image display device is suitable with high precision.

It is preferable that the color evaluating method further includes generating color adjustment parameter correcting data for correcting a color adjustment parameter used when performing color adjustment in the image display device, based on the evaluating result.

By this configuration, it is possible to generate the color adjustment parameter correcting data for correcting the color adjustment parameter.

According to a second aspect of the invention, there is provided a color evaluating program of an image display device, for evaluating colors displayed by the image display device using a color evaluating device, the color evaluating program allowing the color evaluating device to perform the following functions of: displaying an image evaluation image, in which a plurality of color regions corresponding to a pixel or a plurality of pixels of the image display device and each having one of a plurality of colors is included and, among the plurality of color regions, at least one color region and at least one other color region having a color similar to that of the one color region are arranged to be adjacent to each other, on the image display device; and evaluating the colors displayed by the image display device based on picked-up image data obtained by picking up the color evaluation image displayed by the image display device.

By executing the color evaluating program of the image display device in the color evaluating device, the same effect as the color evaluating method of the image display device according to the first aspect of the invention is obtained. It is preferable that even the color evaluating program of the image display device according to the second aspect of the invention has the same characteristics as the color evaluating method of the image display device according to the first aspect of the invention.

According to a third aspect of the invention, there is provided a color evaluating device of an image display device, for evaluating colors displayed by the image display device, including: a controlling unit which displays an image evaluation image, in which a plurality of color regions corresponding to a pixel or a plurality of pixels of the image display device and each having one of a plurality of colors is included and, among the plurality of color regions, at least one color region and at least one other color region having a color similar to that of the one color region are arranged to be adjacent to each other, on the image display device; and a color evaluating unit which evaluates the colors displayed by the image display device based on picked-up image data obtained by picking up the color evaluation image displayed by the image display device.

By using the color evaluating device of the image display device, the same effect as the color evaluating method of the image display device is obtained. It is preferable that even the color evaluating device of the image display device according to the third aspect of the invention has the same characteristics as the color evaluating method of the image display device according to the first aspect of the invention.

It is preferable that the controlling unit displays the color evaluation image on the image display device based on color evaluation image data stored in the color evaluating device.

In this case, the color evaluating device has the color evaluation image data. The color evaluating device sends the color evaluation image data stored in the color evaluating device to the image display device and displays the color evaluation image corresponding to the color evaluation image data on the image display device. Since the color evaluating device has the color evaluation image data, it is possible to realize the color evaluating device of the image display device according to the third aspect of the invention.

It is preferable that the controlling unit displays the color evaluation image on the image display device based on color evaluation image data stored in the image display device.

In this case, the image display device has the color evaluation image data. The color evaluating device issues an instruction for displaying the color evaluation image data to the image display device and the image display device displays the color evaluation image corresponding to the color evaluation image data by the instruction. Since the image display device has the color evaluation image data, it is possible to realize the color evaluating device of the image display device according to the third aspect of the invention.

According to a fourth aspect of the invention, there is provided color evaluation image data used when evaluating colors displayed by an image display device, wherein the color evaluation image data is image data corresponding to an color evaluation image in which a plurality of color regions corresponding to a pixel or a plurality of pixels of the image display device and each having one of a plurality of colors is included and, among the plurality of color regions, at least one color region and at least one other color region having a color similar to that of the one color region are arranged to be adjacent to each other.

Since the color evaluation image data is used, it is possible to evaluate many colors which can be displayed by the image display device only by displaying the color evaluation image corresponding to the color evaluation image data once and thus to efficiently perform the color evaluation with high precision.

Since the color evaluation image corresponding to the color evaluation image data has the arrangement in which, among the plurality of colors, the color regions having similar colors are adjacent to each other, the variation of the colors between the adjacent color regions can be reduced. By using the color evaluation image corresponding to the color evaluation image data, when the optical modulating element (for example, liquid crystal) for controlling the pixels in the matrix method is used, it is possible to reduce the problem that the signal value of any pixel is apt to be influenced by the signal values of the adjacent pixels. It is preferable that even the color evaluation image data according to the fourth aspect of the invention has the same characteristics as the color evaluating method of the image display device according to the first aspect of the invention.

According to a fifth aspect of the invention, there is provided a color evaluation image data generating program of an image display device, for generating color evaluation image data corresponding to an image evaluation image, in which a plurality of color regions corresponding to a pixel or a plurality of pixels of the image display device and each having one of a plurality of colors is included and, among the plurality of color regions, at least one color region and at least one other color region having a color similar to that of the one color region are arranged to be adjacent to each other, by a color evaluation image data generating unit, the color evaluation image data generating program allowing the color evaluation image data generating unit to perform the following functions of: quantizing an n-dimensional (n is an integer of at least 3) color space and generating color arrangement data corresponding to a color arrangement when points in the quantized color space are arranged using a predetermined space-filling curve; and generating color evaluation image data corresponding to the color evaluation image such that adjacent colors in the color arrangement corresponding to the color arrangement data are adjacent to each other in at least a portion even in the color evaluation image.

It is possible to generate the color evaluation image data according to the fourth aspect of the invention by the color evaluation image data generating program according to the fifth aspect of the invention.

According to a sixth aspect of the invention, there is provided a color adjusting method of an image display device, for evaluating colors displayed by the image display device and adjusting the colors displayed by the image display device based on the evaluating result, including: displaying an image evaluation image, in which a plurality of color regions corresponding to a pixel or a plurality of pixels of the image display device and each having one of a plurality of colors is included and, among the plurality of color regions, at least one color region and at least one other color region having a color similar to that of the one color region are arranged to be adjacent to each other, on the image display device; evaluating the colors displayed by the image display device based on picked-up image data obtained by picking up the color evaluation image displayed by the image display device; generating color adjustment parameter correcting data for correcting a color adjustment parameter used when performing color adjustment in the image display device, based on the evaluating result; and correcting the color adjustment parameter based on the color adjustment parameter correcting data.

By performing the above-described steps, it is possible to perform the high-precision color adjustment of the image display device for a short time. That is, the color evaluation image data according to the fourth aspect of the invention is used as the color evaluation image data, the color evaluation image data is color-adjusted in the image display device, and the color evaluation image corresponding to the color-adjusted color evaluation image data is displayed.

The color evaluating device performs the color evaluation based on the picked-up image data obtained by picking up the displayed color evaluation image by the image pickup device, generates color adjustment parameter correcting data for correcting the color adjustment parameter based on the evaluating result, and outputs the generated color adjustment parameter correcting data to the image display device.

The image display device corrects the color adjustment parameter based on the color adjustment parameter correcting data, performs the color adjustment using the color adjustment parameter after correction, and displays the color evaluation image corresponding to the color-adjusted color evaluation image data.

The above-described process is performed until an optimal evaluating result is obtained. By performing the above-described color adjusting process, it is possible to optimize the colors displayed by the image display device.

It is preferable that the color adjusting method of the image display device according to the sixth aspect of the invention has the same characteristics as the color evaluating method of the image display device according to the first aspect of the invention.

According to a seventh aspect of the invention, there is provided a color adjusting device of an image display device, for evaluating colors displayed by the image display device and adjusting the colors displayed by the image display device based on the evaluating result, including: the image display device which includes an image display unit for displaying an image evaluation image, in which a plurality of color regions corresponding to a pixel or a plurality of pixels of the image display device and each having one of a plurality of colors is included and, among the plurality of color regions, at least one color region and at least one other color region having a color similar to that of the one color region are arranged to be adjacent to each other, and a color adjustment parameter controlling unit for correcting a color adjustment parameter for adjusting the color of image data to be displayed; and a color evaluating device which evaluates the colors displayed by the image display device based on picked-up image data obtained by picking up the color evaluation image displayed by the image display device and generates color adjustment parameter correcting data for correcting a color adjustment parameter used based on the evaluating result.

Even in the color adjusting device of the image display device, the same effect as the color adjusting method of the image display device according to the sixth aspect of the invention is obtained. It is preferable that even the color adjusting device of the image display device according to the seventh aspect of the invention has the same characteristics as the color evaluating method of the image display device according to the first aspect of the invention.

It is preferable that color evaluation image data corresponding to the color evaluation image is generated or stored by the color evaluating device, and the color evaluation image data generated or stored by the color evaluating device can be output to the image display device.

In this case, the color evaluating device has the color evaluation image data. The color evaluating device sends the color evaluation image data stored in the color evaluating device to the image display device and displays the color evaluation image corresponding to the color evaluation image data on the image display device.

By storing the color evaluation image data in the color evaluating device, it is possible to realize the color adjusting device of the image display device according to the seventh aspect of the invention. The color evaluating device may store the color evaluation image data or has the color evaluation image data generating program for generating the color evaluation image data and generate the color evaluation image data by the color evaluation image data generating program.

It is preferable that color evaluation image data corresponding to the color evaluation image is generated or stored by the image display device.

In this case, the image display device has the color evaluation image data. The color evaluating device issues the instruction for displaying the color evaluation image data to the image display device and the image display device displays the color evaluation image corresponding to the color evaluation image data by the instruction.

By storing the color evaluation image data in the image display device, it is possible to realize the color adjusting device of the image display device according to the seventh aspect of the invention. The image display device may store the color evaluation image data or has the color evaluation image data generating program for generating the color evaluation image data and generate the color evaluation image data by the color evaluation image data generating program. When the color evaluation image data is stored in the image display device, in order to allow the color evaluating device to perform the color evaluation, the color evaluating device has the same color evaluation image data as the image display device.

According to an eighth aspect of the invention, there is provided an image display device comprising: an image display unit which can display an image for each of pixels based on image data and displays an image evaluation image, in which a plurality of color regions corresponding to the pixels and each having one of a plurality of colors is included and, among the plurality of color regions, at least one color region and at least one other color region having a color similar to that of the one color region are arranged to be adjacent to each other; a color evaluating unit which evaluates colors displayed by the image display unit based on picked-up image data obtained by picking up the color evaluation mage displayed by the image display unit and generates color adjustment parameter correcting data for correcting a color adjustment parameter for adjusting the color of the image data to be displayed, based on the evaluating result; and a color adjustment parameter controlling unit which corrects the color adjustment parameter based on the color adjustment parameter correcting data generated by the color evaluating unit.

By this configuration, it is possible to perform the high-precision color adjustment of the image display device for a short time. That is, the color evaluation image data according to the fourth aspect of the invention is used as the color evaluation image data and the color evaluation image corresponding to the color evaluation image data is displayed.

The color evaluating unit performs the color evaluation based on the picked-up image data obtained by picking up the displayed color evaluation image by the image pickup device, generates color adjustment parameter correcting data for correcting the color adjustment parameter based on the evaluating result, and outputs the generated color adjustment parameter correcting data to the color adjustment parameter controlling unit.

The color adjustment parameter controlling unit corrects the color adjustment parameter based on the color adjustment parameter correcting data, performs the color adjustment using the color adjustment parameter after correction, and displays the color evaluation image corresponding to the color-adjusted color evaluation image data.

The above-described process is performed until an optimal evaluating result is obtained. By performing the above-described color adjusting process, it is possible to optimize the colors displayed by the image display device.

It is preferable that the image display device according to the eighth aspect of the invention has the same characteristics as the color evaluating method of the image display device according to the first aspect of the invention .

BRIEF DESCRIPTION OF THE DRAWINGS

The invention will be described with reference to the accompanying drawings, wherein like numbers reference like elements.

FIG. 16 is a view showing an example of a program for arranging and storing color coordinates of points quantized in a three-dimensional color space one by one along a Hilbert curve.

DESCRIPTION OF EXEMPLARY EMBODIMENTS

Hereinafter, embodiments of the invention will be described. In the following embodiments, an image display device will be described using a projector.

First Embodiment

Figure 1:
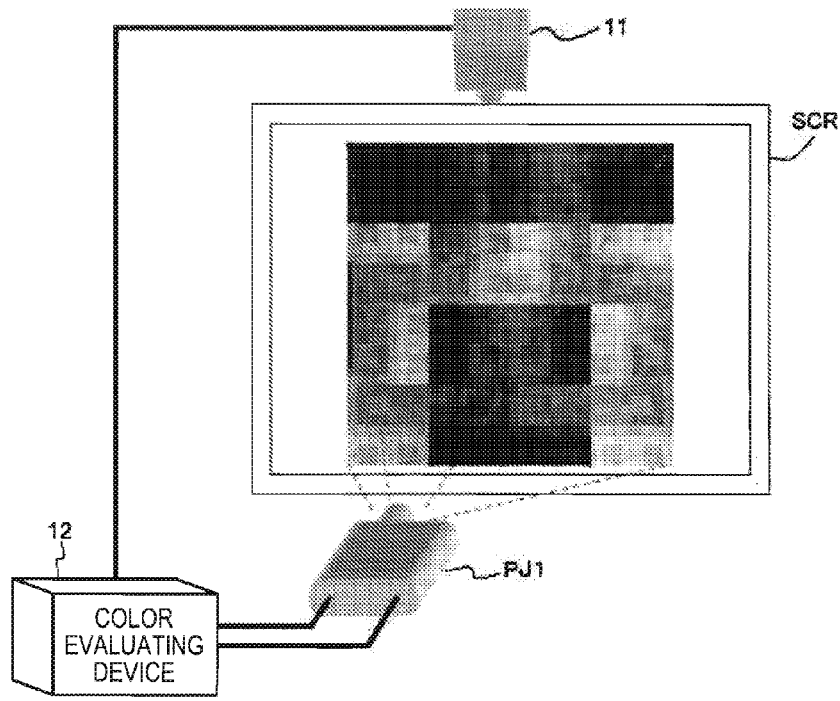
FIG. 1 is a view showing the configuration of a color adjusting device of an image display device according to a first embodiment of the invention.

FIG. 1 is a view showing the configuration of a color adjusting device of an image display device according to a first embodiment of the invention. As shown in FIG. 1, the color adjusting device of the image display device according to the first embodiment includes a projector PJ1 which projects an image onto a screen SCR, an image pickup device 11 which picks up the image projected onto the screen SCR and outputs picked-up image data, and a color evaluating device 12 which has a function for outputting color evaluation image data to the projector PJ1 and a function for evaluating colors displayed by the projector PJ1 based on the picked-up image data from the image pickup device 11 and outputting the evaluating result.

It is assumed that the image pickup device 11 has color resolution and space resolution capable of identifying colors one by one when the projector PJ1 assigns and displays the colors to a pixel or a plurality of pixels, respectively.

Figure 2:
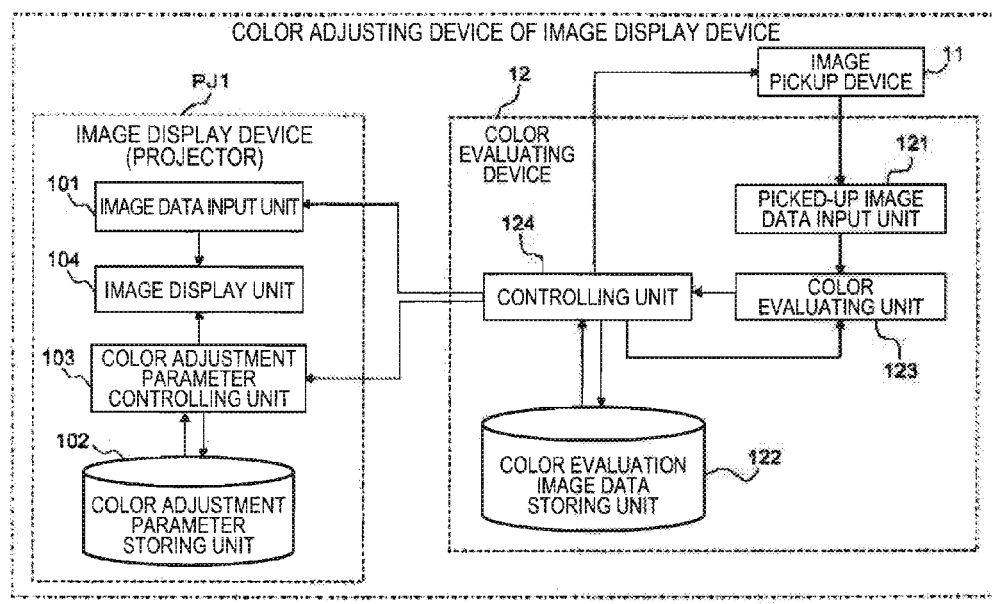
FIG. 2 is a block diagram showing the configuration of a projector PJ1 and a color evaluating device 12 shown in FIG. 1 in detail.

FIG. 2 is a block diagram showing the configuration of the projector PJ1 and the color evaluating device 12 shown in FIG. 1 in detail. As shown in FIG. 2, the projector PJ1 includes an image data input unit 101 which receives the color evaluation image data from the color evaluating device 12 and image data such as contents (not shown herein), a color adjustment parameter storing unit 102 which stores data color adjustment parameter) necessary for color adjustment such as three-dimensional color conversion table or a gamma property of each color, a color adjustment parameter controlling unit 103 which receives color adjustment parameter correcting data output from the color evaluating device 12, corrects the color adjustment parameter stored in the color adjustment parameter storing unit 102 based on the received color adjustment parameter correcting data and outputs the color adjustment parameter after correction, and an image display unit 104 which performs a proper color adjustment on the color evaluation image data input to the image data input unit 101 based on the color adjustment parameter output from the color adjustment parameter controlling unit 103 and projects the color-adjusted color evaluation image data onto the screen SCR as a projection image.

The color evaluating device 12 includes a picked-up image data input unit 121 which receives the picked-up image data from the image pickup device 11, a color evaluation image data storing unit 122 which stores the color evaluation image data necessary for generating the color evaluation image data output to the projector PJ1, a color evaluating unit 123 which has a function for evaluating the colors displayed by the projector PJ1 from the image data picked up by the image pickup device 11 and the color evaluation image data (color evaluation image data output to the projector PJ1 at that time) stored in the color evaluation image data storing unit 122 to obtain the result of the evaluation (referred to as the evaluating result) and generating the color adjustment parameter correcting data for correcting the color adjustment parameter used when performing the color adjustment in the projector PJ1, based on the evaluating result, and a controlling unit 124 which has a function for outputting the color evaluation image data to the projector PJ1 and a function for outputting the color adjustment parameter correcting data generated by the color evaluating unit 123 to the projector PJ1.

The color evaluating device 12 may use an information processing device such as a personal computer.

In the protector PJ1, in order to perform the color adjustment for allowing its color to be displayed in an optimal state, it is preferable that a plurality of colors which can be displayed with the color resolution of the projector PJ1 is actually displayed and the evaluation for the plurality of the displayed colors is performed to obtain the evaluating result.

However, as described above, when an optical modulating element (for example, liquid crystal) for controlling pixels in a matrix method is used and the color of any pixel (referred to as an attention pixel) is measured and determined to be significantly different from the signal values (colors) of a pixels adjacent to the attention pixel the signal value (color) of the attention pixel is apt to be influenced by the signal values of the adjacent pixels. In order to solve such a problem it is preferable that a color evaluation image which satisfies a condition that the colors of which the number is closer to the number of the colors which can be displayed with the color resolution of the projector can be displayed and the arrangement of the colors (hereinafter, referred to as a color arrangement) in which the number of adjacent pixels having the signal value significantly different from that of any pixel is small is formed is used.

In order to use the color evaluation image which satisfies the above-described condition, the color evaluation image data corresponding to the color evaluation image is generated by the following procedure.

First, as a first process, a three-dimensional color space of RGB is scanned in the order of a three-dimensional space-filling curve (for example, a fractal curve) as a color space to be evaluated and a color coordinate string in the three-dimensional color space of RGB is obtained in the scan orders thereby one-dimensionalizing the three-dimensional color space of RGB. More specifically, the three-dimensional color space of RGB is quantized as the color space to be evaluated, points in the three-dimensional color space obtained by quantization are scanned in the order of the three-dimensional space-filling curve (for example, the fractal curve), and the color coordinate string in the three-dimensional color space of RGB is obtained in the scan order, thereby one-dimensionalizing the three-dimensional color space of RGB.

Figure 3:
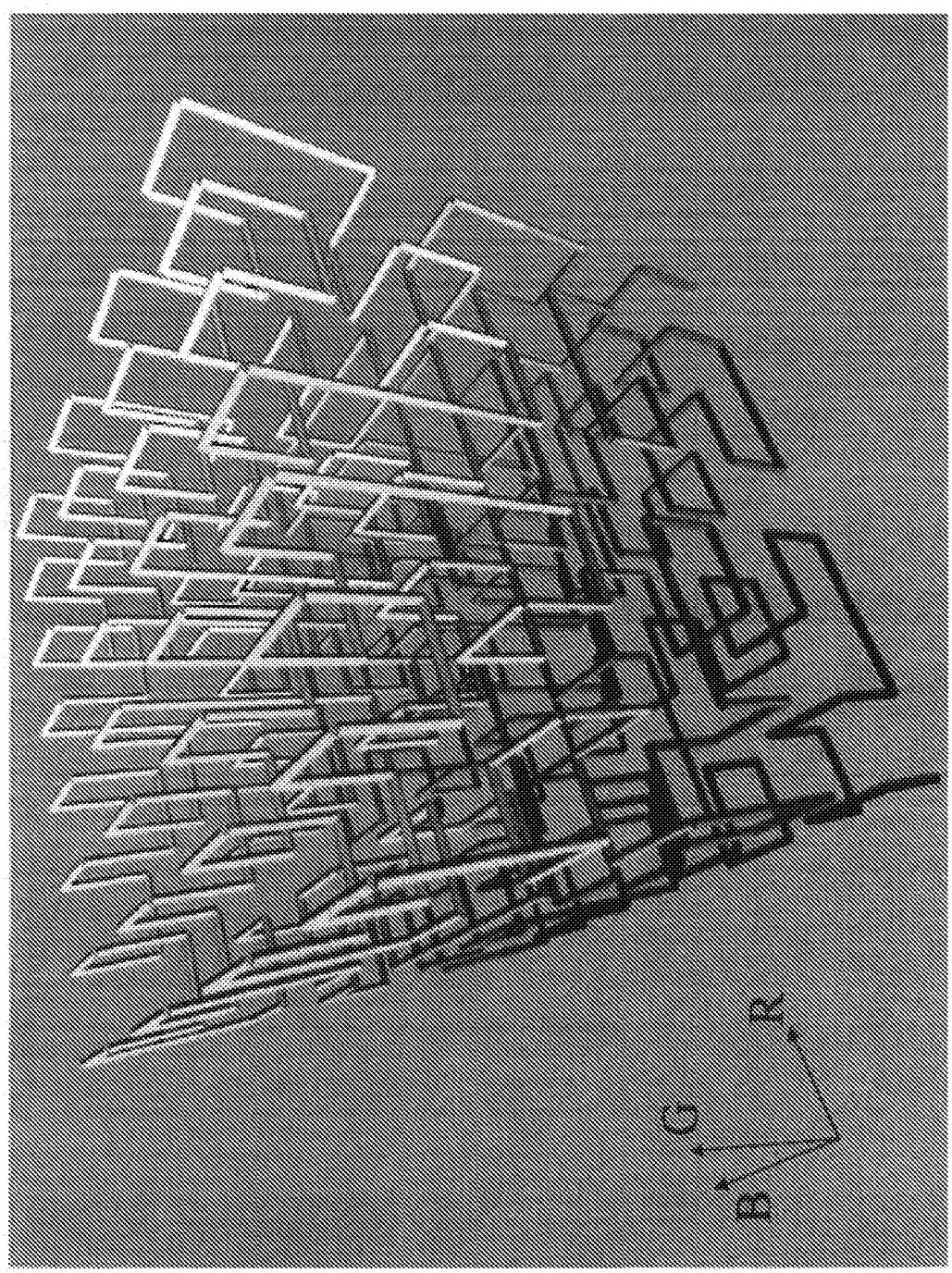
FIG. 3 is a view showing an example of one-dimensionalizing color coordinates of total 521 colors when colors RGB are respectively changed to 8 gradations in the order of a three-dimensional Hilbert curve which is one of a fractal curve.

FIG. 3 is a view showing an example of one-dimensionalizing color coordinates of total 512 colors when colors RGB are respectively changed to 8 gradations in the order of a three-dimensional Hilbert curve which is one of the fractal curve. Here, the color coordinate is a coordinate in which coordinate values correspond to the values of the colors RGB. Since the variation of adjacent colors when the one-dimensionalization is performed in the order of the three-dimensional Hilbert curve is small, the color arrangement in which similar colors are arranged to be adjacent to each other. Since FIG. 3 is a monochromic drawing, it is difficult to recognize the variation of the color from FIG. 3. However, the variation of the color can be easily recognized from an original multi-color image of FIG. 3.

Next, as a second process, each coordinate of the color coordinate string in the three-dimensional color space of RGB obtained by the first process is one-dimensionalized in the order of a two-dimensional space-filling curve. As a third process, the color coordinates of the color coordinate string in the three-dimensional color space of RGB are set as pixel values one by one for each coordinate in the order of each pixel of RGB which is one-dimensionalized.

By performing the first to third processes, the continuous three-dimensional color space shown in FIG. 3 is converted into the two-dimensional color space of RGB having the same continuity.

Hereinafter, an example of the color evaluation image data corresponding to the color evaluation image used in the color adjusting device of the image display device according to the first embodiment will be described with reference to FIGS. 4A and 4B.

Figures 4A, 4B:
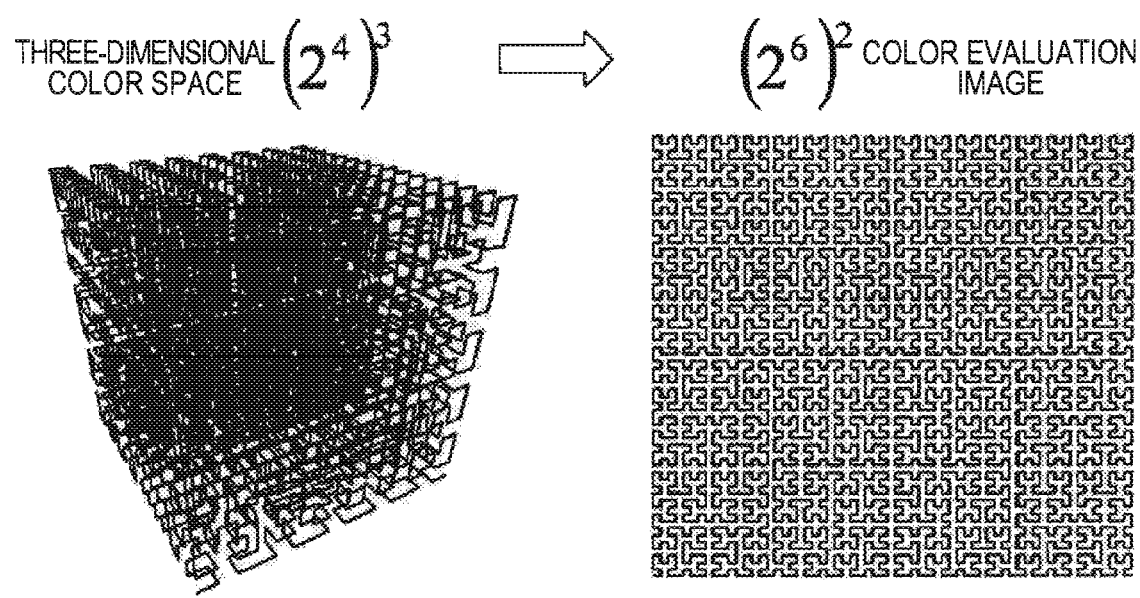
FIGS. 4A and 4B are views explaining color evaluation image data used in the color adjusting device of the image display device according to the first embodiment of the invention.

FIG. 4A is a view showing an example of one-dimensionalizing the color coordinates of total 4096 colors when the colors RGB are respectively changed to 16 gradations in the order of the three-dimensional Hilbert curve which is one of the fractal curve. FIG. 4B is a view showing an example of one-dimensionally tracing 4096 grids by the two-dimensional Hilbert curve when the color evaluation image is divided into 64×64=4096 grids.

The values of the colors RGB obtained whenever a bent line of the three-dimensional Hilbert curve shown in FIG. 4A advances by one step, that is, the values of the quantized colors RGB are set as the pixel values of the grids whenever a bent line of the two-dimensional Hilbert curve shown in FIG. 4B advances by one step, thereby two-dimensionally mapping the three-dimensional color space.

Figure 5:
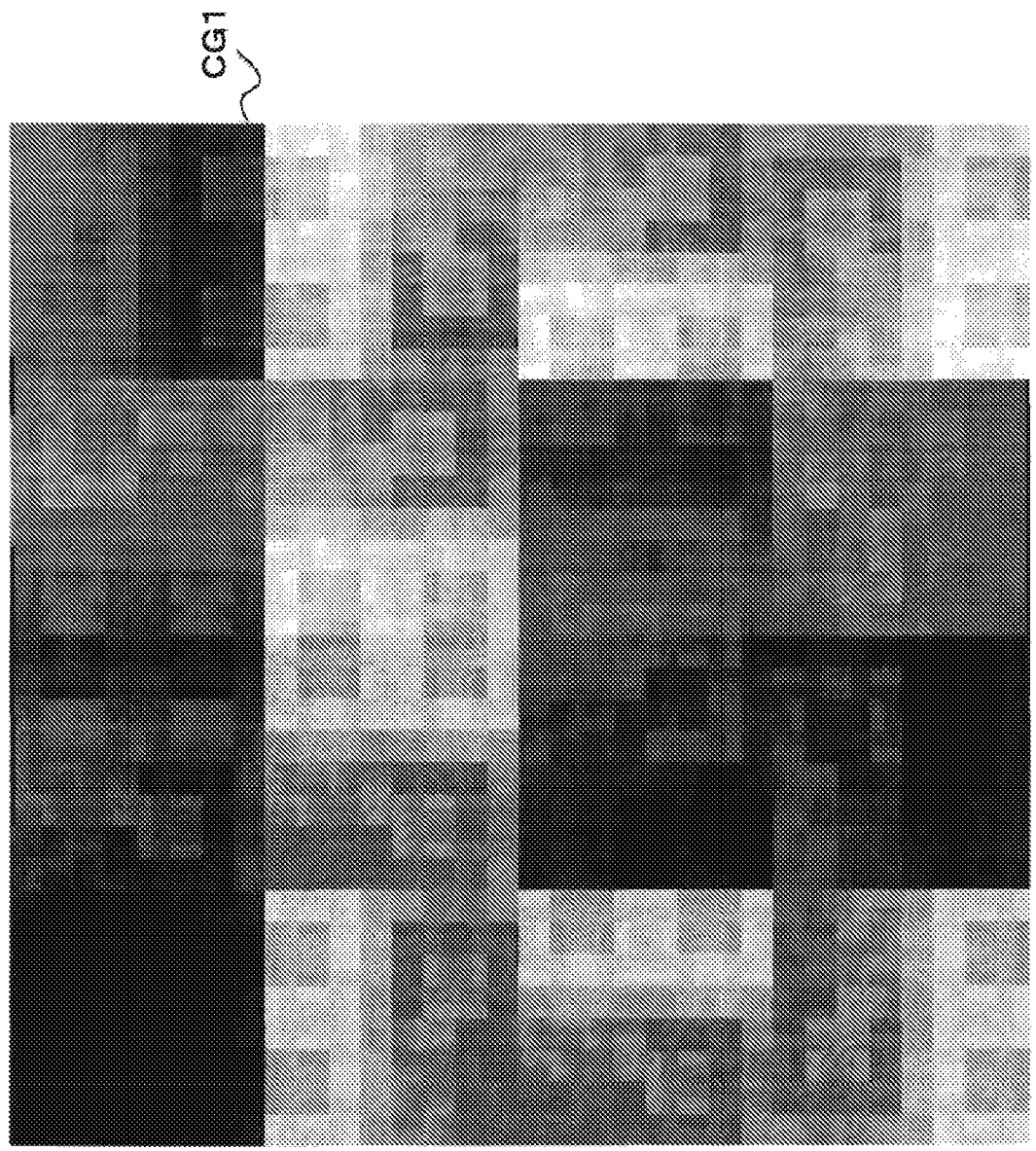
FIG. 5 is a view showing a color evaluation image CG1 generated by the procedure of FIGS. 4A and 4B.

FIG. 5 is a view showing a color evaluation image having the two-dimensional color arrangement generated by the procedure of FIGS. 4A and 4B. The color evaluation image having the two-dimensional color arrangement shown in FIG. 5 has a color region arrangement in which each of the color regions of 64×64 (4096 colors) (one grid corresponding to each of 4096 colors corresponds to one color region in FIG. 5) is arranged in a lattice shape (a square lattice shape in FIG. 5). Each color region corresponds to one or plural pixels in the optical modulating element of the projector PJ1 and is an image displayed by transmitting or reflecting one or plural pixels. The color evaluation image shown in FIG. 5 is used as the color evaluation image CG1 in the color adjusting device of the image display device according to the first embodiment.

It can be seen that the color evaluation image CG1 shown in FIG. 5 has an arrangement that, among the color regions having a plurality of colors, in at least a given color region except the color region located at the end of the color evaluation image, two of the color regions (four color regions, in the example shown in FIG. 5) adjacent to the given color region have colors similar to that of the given color region. Accordingly, even in the entire color evaluation image CG1, the image has averagely a small color difference between adjacent color regions.

Since FIG. 5 is the monochromic drawing, it is difficult to recognize the variation of the color from FIG. 5. However, the variation of the color can be easily recognized from an original multi-color image of FIG. 5.

The "similar colors" are adjacent colors in the arrangement when the points in the color space obtained by quantizing the n-dimensional (three-dimensional, in the embodiment of the invention) color space are arranged using a predetermined space-filling curve (for example, the Hilbert curve), in the embodiment of the invention. The points in the color space obtained by quantizing the n-dimensional (three dimensional, in the embodiment of the invention) color space are denoted by the points shown in FIG. 6.

Figure 6:
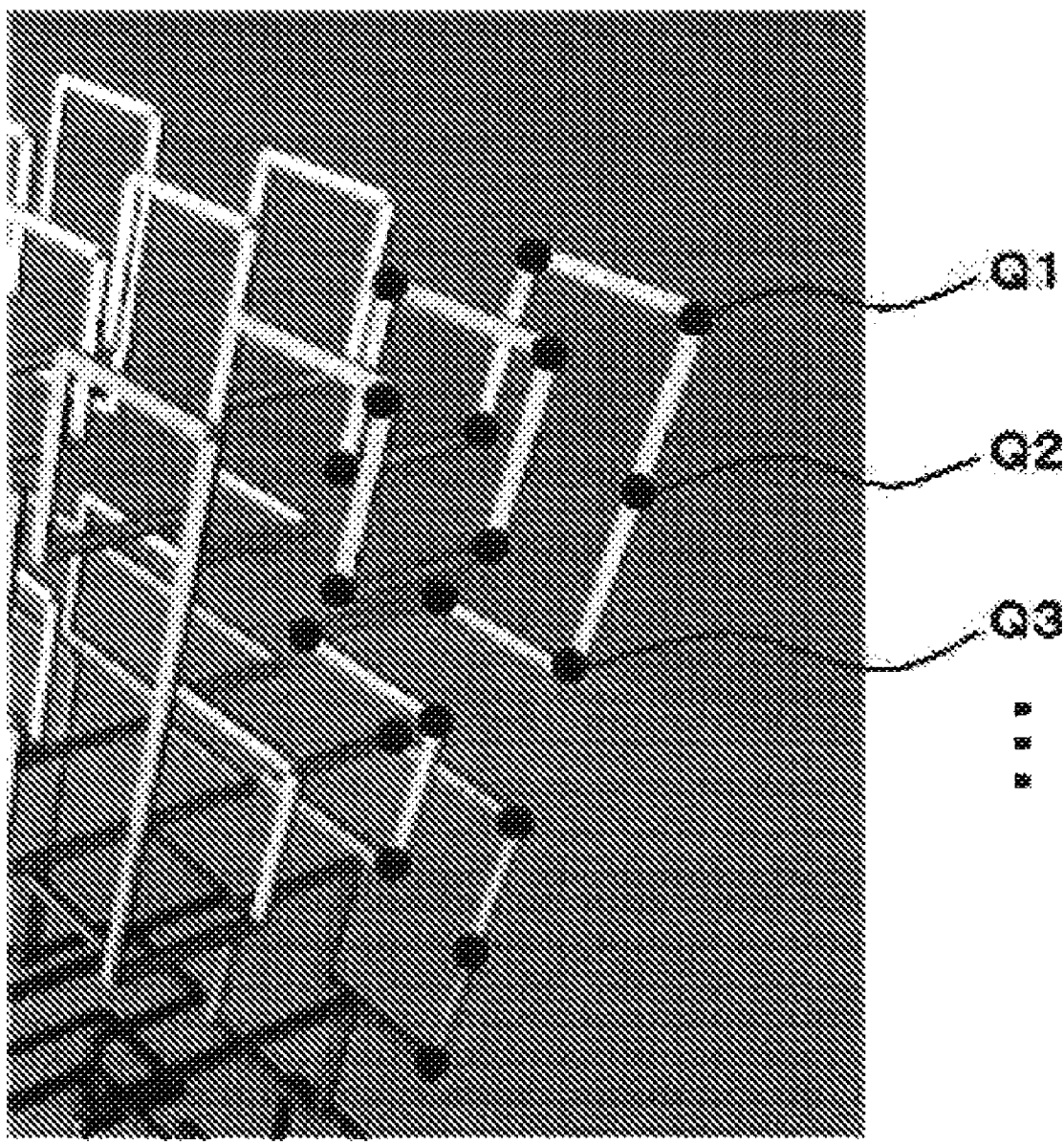
FIG. 6 is a view showing a portion of FIG. 3 for explaining points in a color space obtained by quantizing n-dimensional color space.

FIG. 6 is a view showing a portion of FIG. 3 for explaining the points in the color space obtained by quantizing three-dimensional color space. The points Q1, Q2, Q3, . . . denoted by black circles of FIG. 6 denote the points in the color space obtained by quantizing the three-dimensional color space. The points Q0, Q2, Q3, . . . correspond to the colors of the color regions, respectively. Although the portions of the points Q1, Q2, . . . Q3, . . . are shown in FIG. 6, the points Q1, Q2, Q3, . . . correspond to 512 colors in the example of FIG. 3 or correspond to 4096 colors in the example of FIGS. 4A and 4B, respectively.

The color evaluation image CG1 shown in FIG. 5 is formed of 64×64=4096 colors so as to be easily recognized from the original multi-color image of FIG. 5. Accordingly, by using the color evaluation image CG1 shown in FIG. 5, it is possible to obtain the evaluating result of many colors only by displaying the color evaluation image CG1 once. Accordingly, it is possible to efficiently perform the color evaluation with high precision. By efficiently performing the color evaluation with high precision, it is possible to efficiently perform color adjustment of the projector with high precision.

Although the color evaluation image CG1 shown in FIG. 5 is formed of 64×64=4096 colors, the color evaluation image CG1 has the arrangement that, among the color regions having a plurality of colors, in at least the given color region except the color region located at the end of the color evaluation image, two of the color regions (four color regions, in the example shown in FIG. 5) adjacent to the given color region have colors similar to that of the given color region, so as to be easily recognized from the original multi-color image of FIG. 5. Accordingly, when the color of the attention pixel is measured using the optical modulating element (for example, liquid crystal) for controlling the pixels in the matrix method, it is possible to satisfy the condition that the signal values of the pixels adjacent to the attention pixel are not significantly different from each other.

The color adjusting process of the image display device according to the first embodiment is performed as follows. First, the color evaluation image data corresponding to the color evaluation image CG1 shown in FIG. 5 is read from the color evaluation image data storing unit 122 of the color evaluating device 12 and the read color evaluation image data is output to the image data input unit 101 of the projector PJ1 by the controlling unit 124.

The image display unit 104 of the projector PJ1 performs the color adjustment on the color evaluation image data based on the color adjustment parameter stored in the color adjustment parameter storing unit 102 at that time and projects the color-adjusted color evaluation image CG1 onto the screen SCR.

Next, the color evaluation image CG1 projected onto the screen SCR is picked up by the image pickup device 11 and the picked-up image data is input to the color evaluating unit 123 of the color evaluating device 12 through the picked-up image data input unit 121.

The color evaluating unit 123 compares the picked-up image data obtained by picking up the color evaluation image displayed by the projector PJ1 by the image pickup device 11 with the evaluation image data (color evaluation image data output to the projector PJ1 at that time) stored in the color evaluation image data storing unit 122 and evaluates how much color shift occurs in the color of which region.

The color adjustment parameter correcting data is generated based on the evaluating result. The color adjustment parameter correcting parameter is data for setting the correction amount of VT gamma for determining a relationship between an applied voltage and the transmissivity of light when the optical modulating element is, for example, a liquid crystal device. The color adjustment parameter correcting data generated by the color evaluating unit 123 is applied to the projector PJ1 by the controlling unit 124.

In the projector PJ1, the color adjustment parameter controlling unit 103 receives the color adjustment parameter correcting data supplied from the color evaluating device 12 and corrects the color adjustment parameter stored in the color adjustment parameter storing unit 102 using the received color adjustment parameter correcting data. Accordingly, the image display unit 104 of the projector PJ1 performs the proper color adjustment on the color evaluation image data based on the color adjustment parameter and projects the color evaluation image CG1 corresponding to the color-adjusted color evaluation image data onto the screen SCR.

The color evaluation image CG1 projected onto the screen SCR is picked up by the image pickup device 11 and the picked-up image data is input to the color evaluating unit 123 through the picked-up image data input unit 121. Similar to above, the picked-up image data is evaluated by the color evaluation image data stored in the color evaluation image data storing unit 122 and the color adjustment parameter correcting data is generated based on the evaluating result. The above-described process is performed until the colors displayed by the projector PJ1 are suitable.

An operation for evaluating the color evaluation image displayed by the projector PJ1 and generating the color adjustment parameter correcting data based on the evaluating result will be described.

First, the evaluation of the color evaluation image displayed by the projector PJ1 is performed by comparing the picked-up image data from the image pickup device 11 with the color evaluation image data (color evaluation image data corresponding to the color evaluation image CG1 projected by the projector PJ1 at current point of time) stored in the color evaluation image data storing unit 122 in chromaticity for each pixel to obtain the difference thereof.

The evaluating result is data representing how much error exists between the colors of the respective gradation values of RGB in the color evaluation image displayed by the projector PJ1 and the reference colors of the respective gradation values of RGB and can be, for example, displayed as a difference vector of the colors of the respective gradation colors of RGB which form the color evaluation image.

Figure 7:
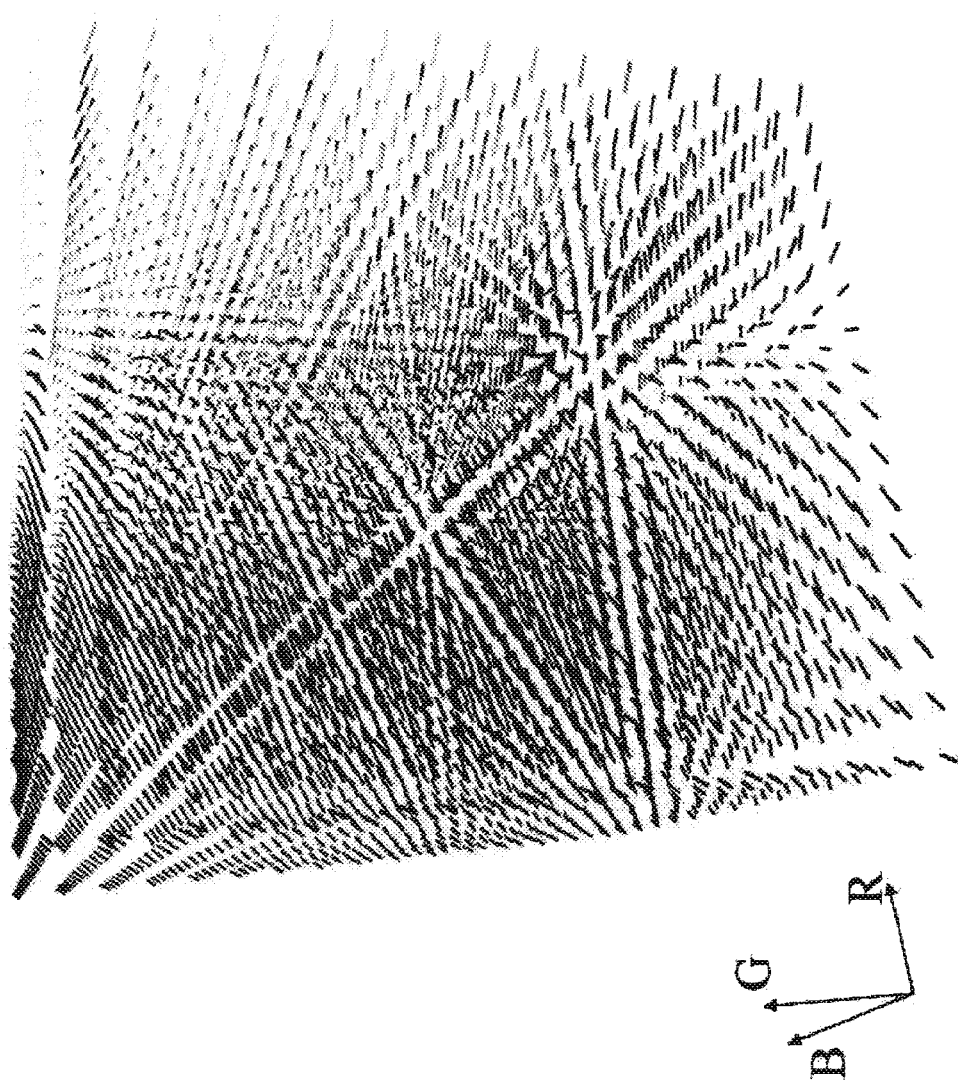
FIG. 7 is a view schematically showing a result of evaluating the colors of the respective gradation values of RGB in the color evaluation image CG1 (4096 colors) shown in FIG. 5 which is mapped on a three-dimensional color space.

FIG. 7 is a view schematically showing a result of evaluating the colors of the respective gradation values of RGB in the color evaluation image CG1 (4096 colors) shown in FIG. 5 which is mapped on the three-dimensional color space. Since FIG. 7 is a monochromic drawing, it is difficult to recognize the variation of the colors of the respective gradation values of RGB in the color evaluation image from FIG. 7. However, the variation of the colors of the respective gradation values of ROB in the color evaluation image can be easily recognized from an original multi-color image of FIG. 7.

In FIG. 7, small lines corresponding to the colors of the respective gradation values of RGB in the color evaluation image denote difference vectors between the colors of the respective gradations of RGB of the color evaluation image and the reference colors (arrows representing directions are omitted so as to prevent the drawing from being complicated. From FIG. 7, it can judge how much error exists between the colors displayed by the projector PJ1 and the colors of the respective gradations of RGB in the color evaluation image.

The color adjustment parameter correcting data is generated based on the difference vector (referred to as error) as the evaluating result. In a process of generating the color adjustment parameter correcting data, the color adjustment parameter correcting data of the colors which can be displayed by the projector PJ1 is generated based on the error obtained with respect to the colors of the respective gradation values of RGB in the color evaluation image.

More specifically, it is possible to generate the color adjustment parameter correcting data of the colors which can be displayed by the projector PJ1 based on any one of the following processes (i), (ii) and (iii).

(i) An average value of errors as the evaluating result is obtained with respect to each of the colors RGB and the color adjustment parameter correcting data of the colors which can be displayed by the projector PJ1 is generated using the obtained average value of the errors of each of the colors RGB. In this case, the color adjustment parameter correcting data is data representing a shift amount for shifting the color adjustment parameter of each of the colors RGB by the average value of the errors of each of the colors RGB.

(ii) An error distribution is obtained from the evaluating result for each of the gradation values of the colors RGB and the color adjustment parameter correcting data of the colors which can be displayed by the projector PJ1 is generated from the obtained error distribution. This will be described using FIGS. 8A to 8C.

Figure 8A:
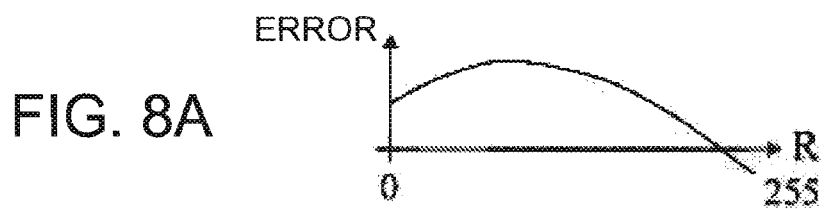
FIGS. 8A to 8C are views showing an error distribution of 256 gradations of 0 to 255 in the colors RGB.
Figure 8B:
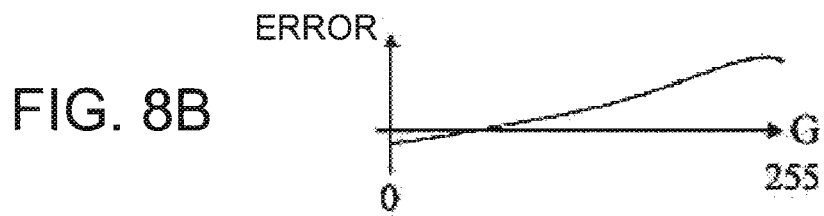

FIG. 8A is a view showing an error distribution of 256 gradations of 0 to 255 in the color R, FIG. 8B is a view showing an error distribution of 256 gradations in the color G, and FIG. 5C is a view showing an error distribution of 256 gradations in the color B.

For example, in the color R, the average value of the errors in a predetermined gradation value among the gradations values of 0 to 255 in the color R (colors of the respective gradation values of RGB in the color evaluation image) is obtained and the obtained average value of the errors is displayed as the error distribution of the gradation values of 0 to 255 by a curve. Even in the colors G and B, the average values of the errors in predetermined gradation values among the gradation values of 0 to 255 are displayed as the respective error distributions of the colors G and B.

Figure 8C:
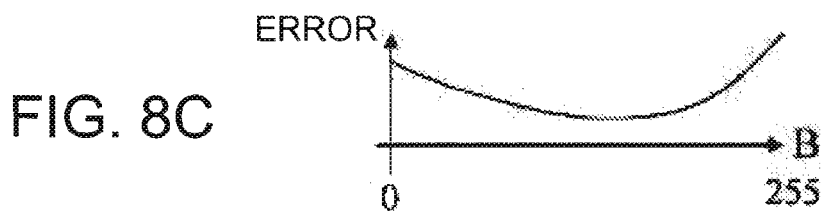

By using the error distribution of 256 gradations of RGB shown in FIGS. 8A to 8C and generating a table of errors in the gradation values of 0 to 255 with respect to each of the colors RGB, it is possible to easily generate the color adjustment parameter correcting data of the colors which can be displayed by the projector PJ1.

(iii) The error of the color except the colors of the respective gradation values of RGB (color except measurement points) in the color evaluation image is obtained by the interpolation from the error as the evaluating result on the three-dimensional color space and the color adjustment parameter correcting data of the colors which can be displayed by the projector PJ1 is generated based on the obtained error.

Figure 9:
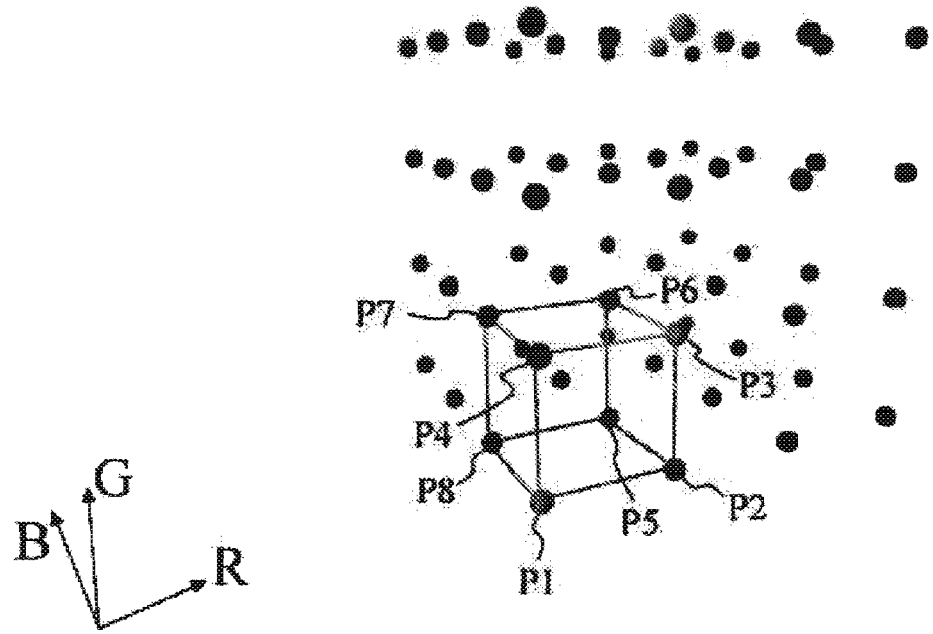
FIG. 9 is a view explaining an example of obtaining the error of colors except measurement points by the interpolation from an error as the evaluating result on the three-dimensional space.

FIG. 9 is a view explaining an example of obtaining the error of the color except the measurement points by the interpolation from the error as the evaluating result on the three-dimensional space. In FIG. 9, black circles denote the colors of the respective gradation values of RGB, that is, the colors of the measure points in the color evaluation image, and the error of the color except the measure points is obtained by the interpolation from the error of the color of the measurement points.

As shown in FIG. 9, the error of a predetermined color in the space surrounded by eight attention colors P1 to P8 is obtained by linear interpolation from the errors of the eight attention colors P1 to P8 among the colors of the measurement points and the color adjustment parameter correcting data of the predetermined color in the space surrounded by the eight attention colors P1 to P8 is generated based on the obtained error. By the interpolation, it is possible to generate the color adjustment parameter correcting data of the colors which can be displayed by the projector PJ1.

As described above, in the first embodiment, since the color evaluation image CG1 shown in FIG. 5 is used, it is possible to efficiently perform the color evaluation of many colors with high precision only by displaying the color evaluation image CG1 once. Thus, it is possible to obtain the high-precision evaluating result. It is possible to generate the color adjustment parameter correcting data based on the evaluating result and to efficiently perform the color adjustment of the colors which can be displayed by the projector with high precision by using the color adjustment parameter correcting data.

The color evaluation image CG1 shown in FIG. 5 has the arrangement that, in at least the given color region except the color region located at the end of the color evaluation image CG1, two of the color regions (four color regions, in the example shown in FIG. 5) adjacent to the given color region have colors similar to that of the given color region. Accordingly, when the optical modulating element (for example, liquid crystal) for controlling the pixels in the matrix method is used and the color of any attention pixel is measured, it is possible to satisfy the condition that the signal values of the pixels adjacent to the attention pixel are not significantly different from each other. Thus, it is possible to reduce the problem that the signal value (color) of the attention pixel is influenced by the signal values of the adjacent pixels and thus cannot be measured with high precision.

Although the projector is described as the image display device in the first embodiment, the invention is not limited to the projector and the other image display device capable of adjusting the colors of image data for each pixel, for example, an image display device having a direct view type display such as a television set, may be used. An image display unit used in the image display device may use a reflection type optical modulating element such as a digital mirror device or a self-emission type organic electroluminescence (organic EL) or plasma display.

Second Embodiment

A second embodiment is preferable in a case of performing the color adjustment of display images when a plurality of image display devices each having a direct view type display is used and the displays are arranged to form a large screen or a case of performing the color adjustment of projected images when the projected images of a plurality of projection type displays are projected through tiling. More particularly, the second embodiment is preferable in a case of performing the color adjustment for color matching of adjacent portions of adjacent display images.

Even in the second embodiment, the image display device will be described using a projector. In the second embodiment, for example, a case where the projected images from a plurality of projectors are projected through tiling will be described.

Figure 10:
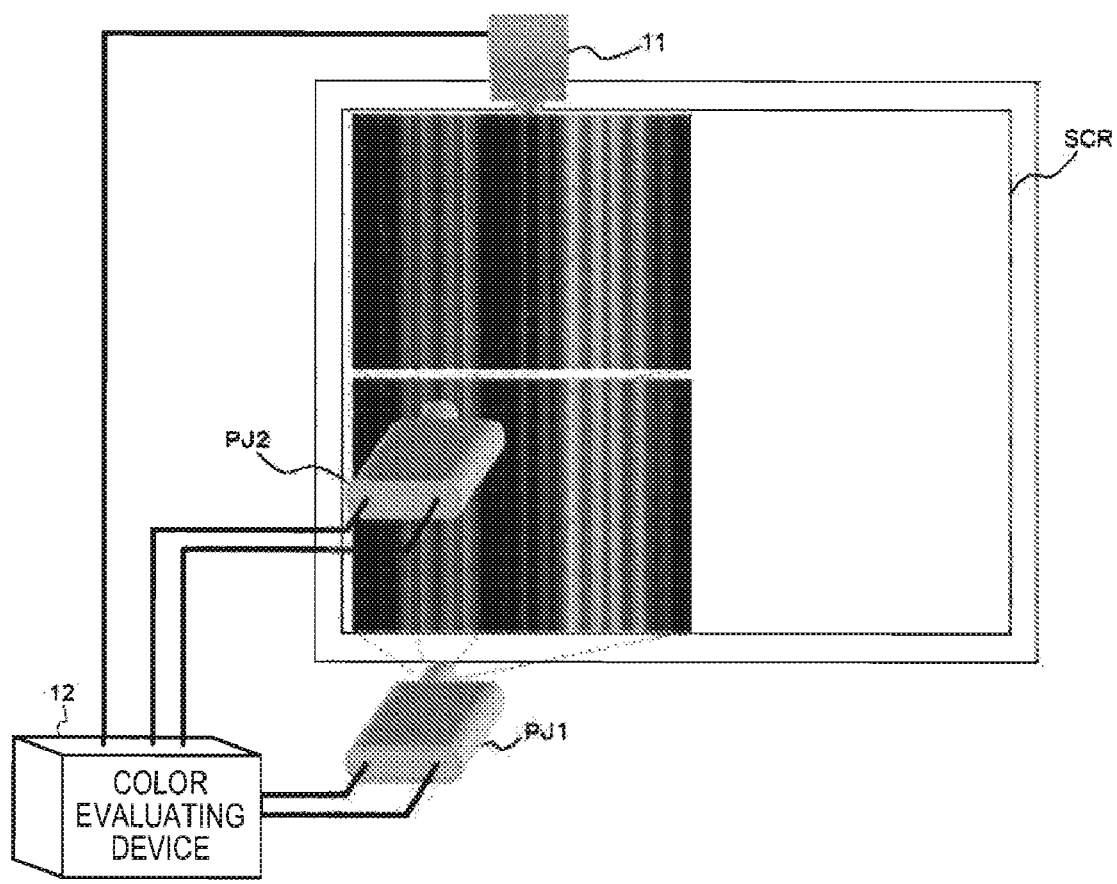
FIG. 10 is a view showing the configuration of a color adjusting device of an image display device according to a second embodiment of the invention.

FIG. 10 is a view showing the configuration of a color adjusting device of an image display device according to a second embodiment of the invention. As shown in FIG. 10, the color adjusting device of the image display device according to the second embodiment is different from FIG. 1 in that two projectors PJ1 and PJ2 for projecting an image onto a screen SCR are used.

The two projectors PJ1 and PJ2 are arranged in a vertical direction and the respective projected images are protected to be arranged on a screen SCR in the vertical direction. An image pickup device 11 picks up two projected images on the screen SCR and outputs the picked-up image data.

Figure 11:
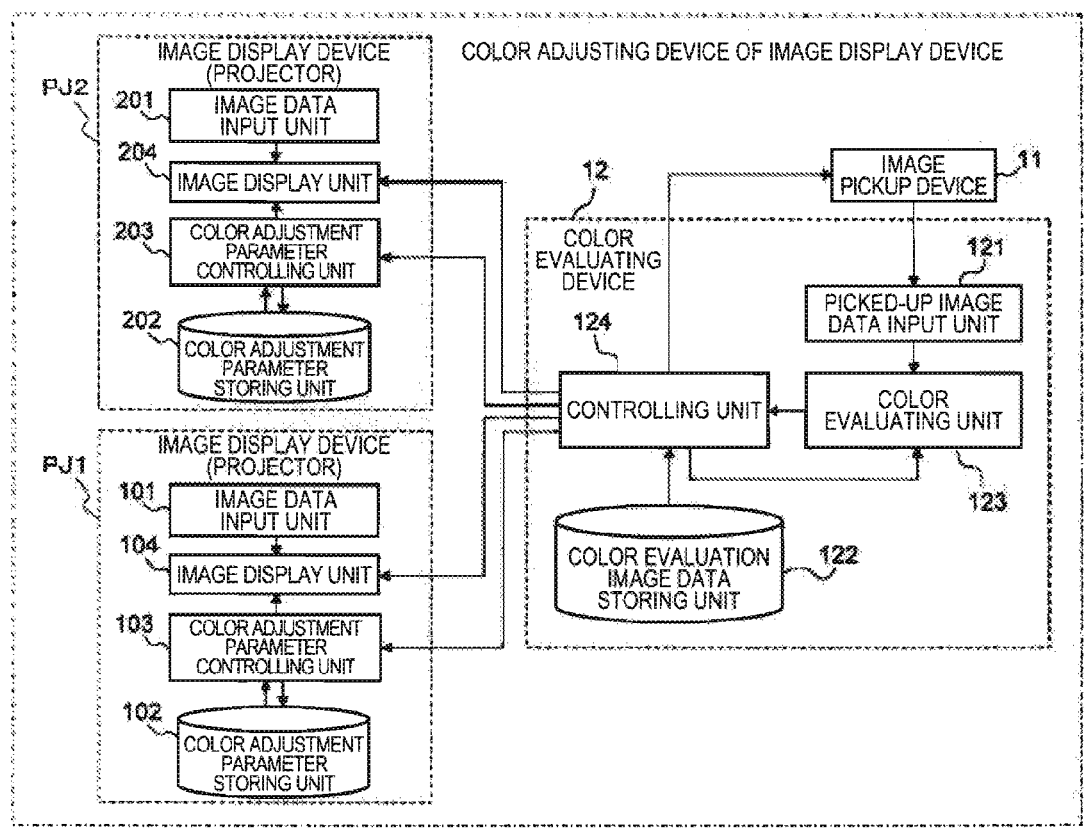
FIG. 11 is a block diagram showing the configuration of projectors PJ1 and PJ2 and a color evaluating device 12 shown in FIG. 10 in detail.

FIG. 11 is a block diagram showing the configuration of projectors PJ1 and PJ2 and a color evaluating device 12 shown in FIG. 10 in detail. FIG. 11 is different from FIG. 2 in that the two projectors are used and thus their description will be omitted.

Figure 12:
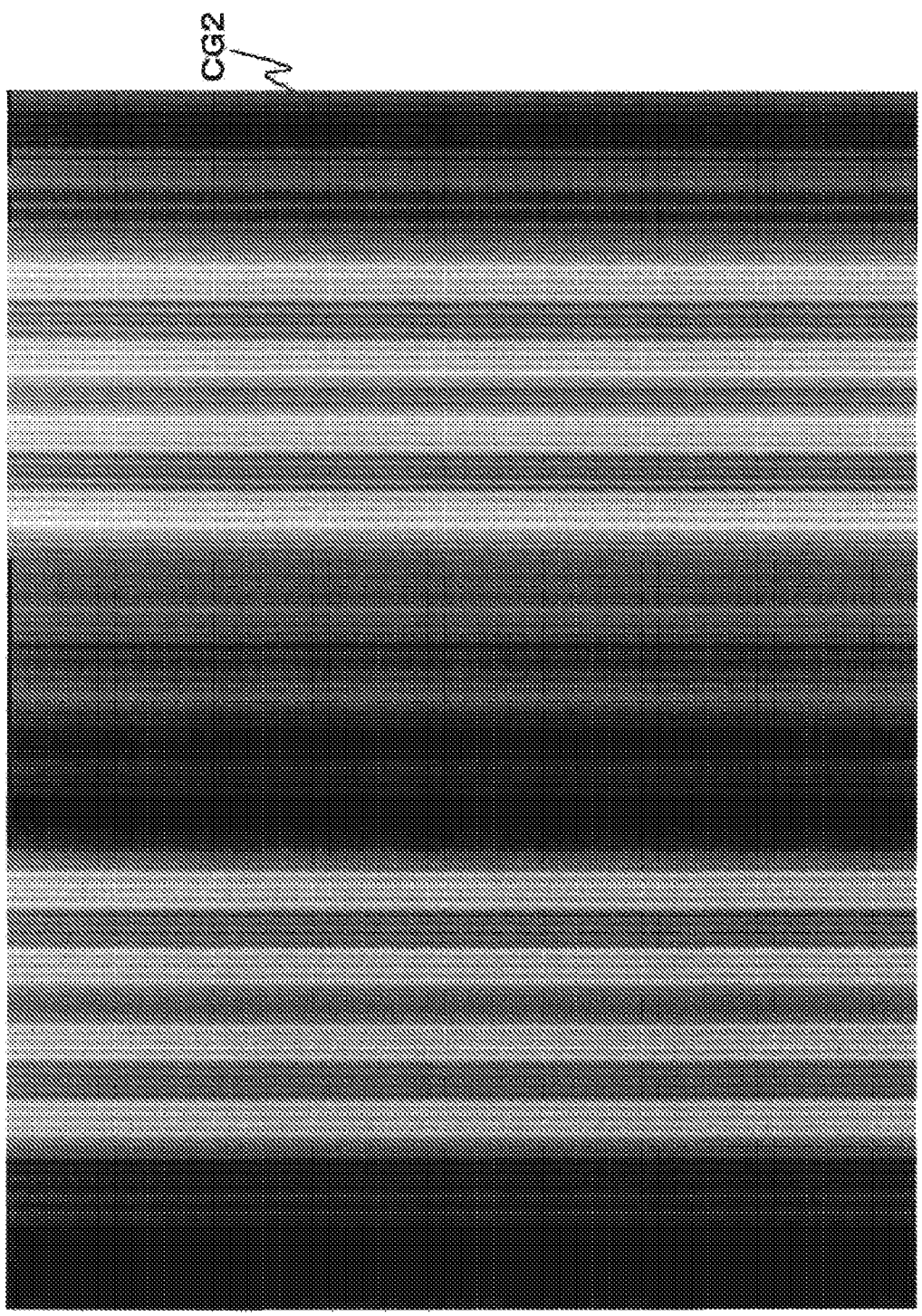
FIG. 12 is a view showing an example of a color evaluation image CG2 used in the color adjusting device of the image display device according to the second embodiment of the invention.

FIG. 12 is a view showing an example of a color evaluation image used in the color adjusting device of the image display device according to the second embodiment. Since the primary purpose of the second embodiment is the color adjustment for color matching of adjacent portions of two adjacent projected images, the color evaluation image CG2 having an one-dimensional color arrangement shown in FIG. 12 is preferably used. The color evaluation image CG2 shown in FIG. 12 is obtained by one-dimensionally mapping a Hilbert curve having 512 colors of eight respective gradations of RGB shown in FIG. 3 and the 512 colors are arranged in a linear shape, that is, a belt shape.

In the color adjustment device of the image display device according to the second embodiment, the projected images from the projectors PJ1 and PJ2 are arranged in the vertical direction to perform the color adjustment for color matching of the adjacent portions of the projected images (see FIG. 10). Accordingly, as shown in FIG. 12, the color evaluation image CG2 has a one-dimensional color arrangement in which 512 colors which vertically extend in the belt shape are arranged in a horizontal direction.

Even in the color evaluation image CG2, the color regions having similar colors are arranged to be adjacent to each other. That is, the color evaluation image CG2 has a color region arrangement in which color regions having a plurality of colors are formed in the belt shape and the long sides of the belt-shaped color regions are arranged to be adjacent to one another. Each of the color regions corresponds to one or plural pixels in the respective optical modulating elements of the projectors PJ1 and PJ2 and, among the color regions having the plurality of colors, in at least a given color region except the color region located at the end of the color evaluation image, two color region adjacent to the given color region have colors similar to that of the given color region. Since FIG. 12 is a monochromic drawing, it is difficult to recognize the variation of the color from FIG. 12. However, the variation of the color can be easily recognized from an original multi-color image of FIG. 12.

By projecting the color evaluating image CG2 shown in FIG. 12 from the projectors PJ1 and PJ2, it is possible to efficiently perform the color adjustment for color matching of the projected image from the projectors PJ1 and PJ2.

The color adjustment process in the color adjustment device of the image display device according to the second embodiment may be performed similar to the first embodiment. That is, color evaluation image data corresponding to the color evaluation image CG2 shown in FIG. 12 is read from a color evaluation image data storing unit 122 of the color evaluating device 12 and output to image data input units 101 and 201 of the projectors PJ1 and PJ2 by a controlling unit 124. Image display units 104 and 204 of the projectors PJ1 and PJ2 perform the color adjustment on the color evaluation image data based on a color adjustment parameter stored in color adjustment parameter storing units 102 and 202 at that time and project the color evaluation image CG2 for the color-adjusted color evaluation image data onto the screen SCR.

Next, the color evaluation image CG2 projected onto the screen SCR is picked up by an image pickup device 11 and the picked-up image data is input to a color evaluating unit 123 of the color evaluating device 12 through the picked-up image data input unit 121. The color evaluating unit 123 compares the picked-up image data from the image pickup device 11 with the color evaluation image data (color evaluation image data corresponding to the color evaluation image CG2 projected onto the projectors PJ1 and PJ2 at current point of time) stored in the color evaluation image data storing unit 122 to obtain an evaluating result.

Color adjustment parameter correcting data is generated based on the evaluating result and is supplied to the projectors PJ1 and PJ2 by the controlling unit 124.

In the projectors PJ1 and PJ2, color adjustment parameter controlling unit 103 and 203 receive the color adjustment parameter correcting data supplied from the color evaluating device 12 and correct the color adjustment parameters stored in the color adjustment parameter storing units 102 and 202 using the received color adjustment parameter correcting data. Accordingly, the image display units 104 and 204 of the projectors PJ1 and PJ2 perform the proper color adjustment on the color evaluation image data based on the corrected color adjustment parameter and project the color evaluation image CG2 corresponding to the color-adjusted color evaluation image data onto the screen SCR.

The color evaluation image CG2 projected onto the screen SCR is picked up by the image pickup device 11 and the picked-up image data is input to the color evaluating unit 123 through the picked-up image data input unit 121. Similar to above, the picked-up image data is compared with the color evaluation image data stored in the color evaluation image data storing unit 122 to output the compared result. The above-described process is performed until the colors displayed by the projectors PJ1 and PJ2 are suitable.

As described above, in the second embodiment, since the color evaluation is performed using the color evaluation image CG2 shown in FIG. 12, it is possible to efficiently obtain the evaluating result of many colors with high precision only by displaying the color evaluation image CG2 once. Thus, it is possible to efficiently perform the color evaluation with high precision. By efficiently performing the color evaluation with high precision, it is possible to efficiently perform the color adjustment for color matching of the projectors PJ1 and PJ2 with high precision.

The color evaluation image CG2 shown in FIG. 12 has the arrangement in which the color regions having similar colors are arranged to be adjacent to each other so as to be easily recognized from the original multi-color image of FIG. 12. More specifically, the color evaluation image CG2 shown in FIG. 12 has the arrangement in which, among the color regions having the plurality of colors, in at least a given color region except the color region located at the end of the color evaluation image, two color region adjacent to the given color region have colors similar to that of the given color region.

When optical modulating elements (for example, liquid crystal) for controlling pixels in a matrix method are used, in a given pixel in the optical modulating elements of the projectors PJ1 and PJ2, the signal values supplied to pixels adjacent to the attention pixel in four directions or eight directions are equal or substantially equal to one another. Accordingly, when the optical modulating elements (for example, liquid crystal) for controlling the pixels in the matrix method are used, it is possible to reduce the problem that the signal value (color) of the attention pixel is apt to be influenced by the signal values of adjacent pixels.

Although the case where the adjacent projected images are projected to be adjacent to each other without overlapping is described in the second embodiment, the invention is applicable to a case where the projected images are projected such that portions of the projected images overlap each other. Although two projectors are used in the second embodiment, the invention is not limited to two projectors.

Although the case where the respective projected images from the projectors PJ1 and PJ2 are projected to be arranged in a vertical direction (see FIG. 10) is described in the second embodiment, the invention is applicable to a case where the respective projected images from the projectors PJ1 and PJ2 are arranged in a horizontal direction. In this case, the color evaluation image CG2 in which 512 belt-shaped colors which extend in the horizontal direction are arranged in the vertical direction may be used.

Although the projector is described as the image display device in the second embodiment, the invention is not limited to the projector and the other image display device capable of adjusting the colors of image data for each pixel, for example, an image display device having a direct view type display such as a television set, may be used. An image display unit used in the image display device may use a reflection type optical modulating element such as a digital mirror device or a self-emission type organic electroluminescence (organic EL) or plasma display.

Third Embodiment

In a third embodiment, color adjustment for color matching of a plurality of projected images can be efficiently performed with high precision when an image display device is a projector and the projected images from a plurality of projectors are projected onto the same place of a screen SCR to overlap one another (stacking projections.

Figure 13:
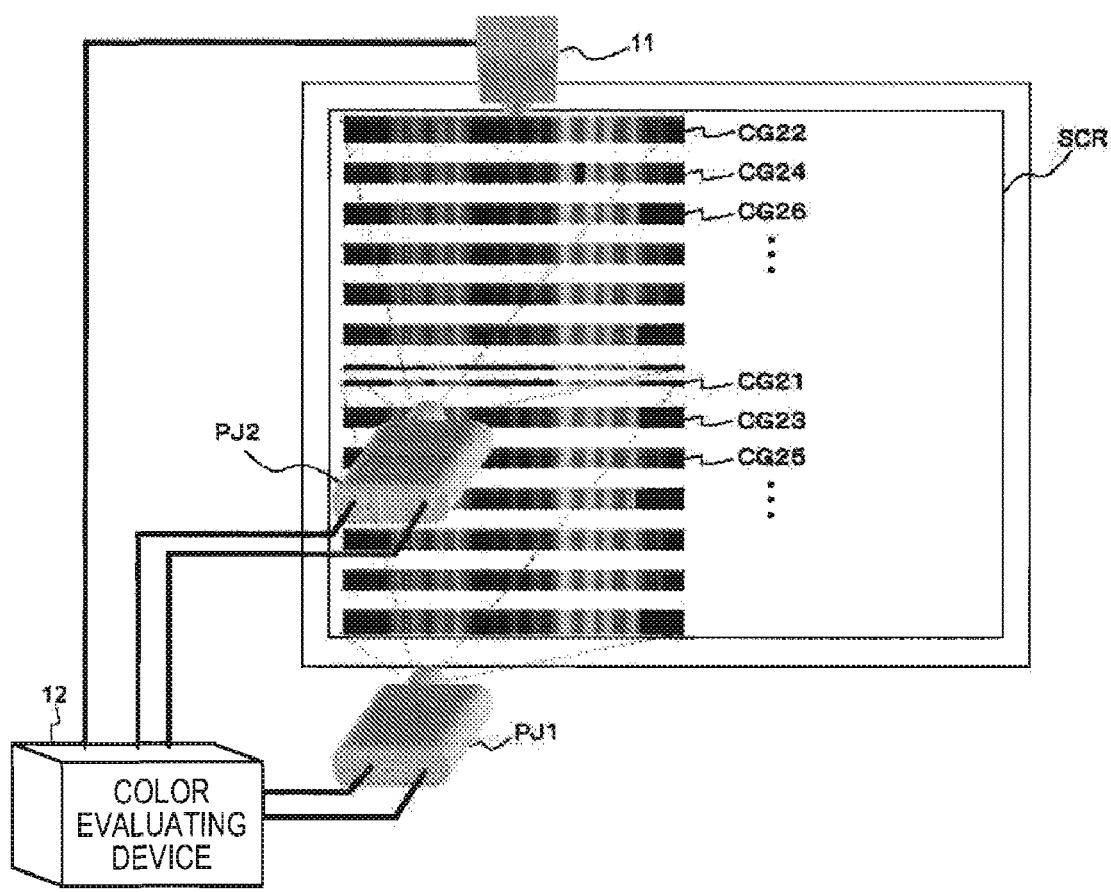
FIG. 13 is a view showing the configuration of a color adjusting device of an image display device according to a third embodiment of the invention.

FIG. 13 is a view showing the configuration of a color adjusting device of an image display device according to a third embodiment of the invention. As shown in FIG. 13, the color adjusting device of the image display device according to the third embodiment has two projectors PJ1 and PJ2 for projecting images onto the screen SCR, similar to the second embodiment. In the third embodiment, the projected images from the two projectors PJ1 and PJ2 are projected onto the same place of the screen SCR through stacking.

FIG. 13 shows a state before the projected image from the two projectors PJ1 and PJ2 are stacked.

The detailed configuration of the projectors PJ1 and PJ2 and the configuration of the color evaluating device 12 according to the third embodiment may use FIG. 11 used in the description of the second embodiment. The color evaluation image used in the third embodiment uses the color evaluation image CG2 (see FIG. 12) used in the second embodiment.

The projectors PJ1 and PJ2 project stripe-shaped color evaluation images shown in FIG. 13 such that the color evaluation images CG2 are formed on the screen SCR when the projected images from the two projectors PJ1 and PJ2 are properly projected onto the screen SCR through stacking.

That is, elongated partial color evaluation images CG21, CG22, CG23, . . . which extend in a horizontal direction are generated from the color evaluation image CG2 shown in FIG. 12 as the color evaluation images of the projectors PJ1 and PJ2.

The generated partial color evaluation images CG21, CG20, CG23, . . . are alternately assigned to the projectors PJ1 and PJ2, as shown in FIG. 13. In this example, the partial color evaluation images CG21, CG23, CG25, . . . are assigned to the projector PJ1 and the partial color evaluation images CG22, CG24, CG26, . . . are assigned to the projector PJ2.

FIG. 14 is a view showing the projection states of the partial color evaluation images CG21, CG23, CG25, . . . projected from the projector PJ1 and the projection states of partial color evaluation images CG22, CG24, CG26, . . . projected from a projector PJ2.

Figure 14A:
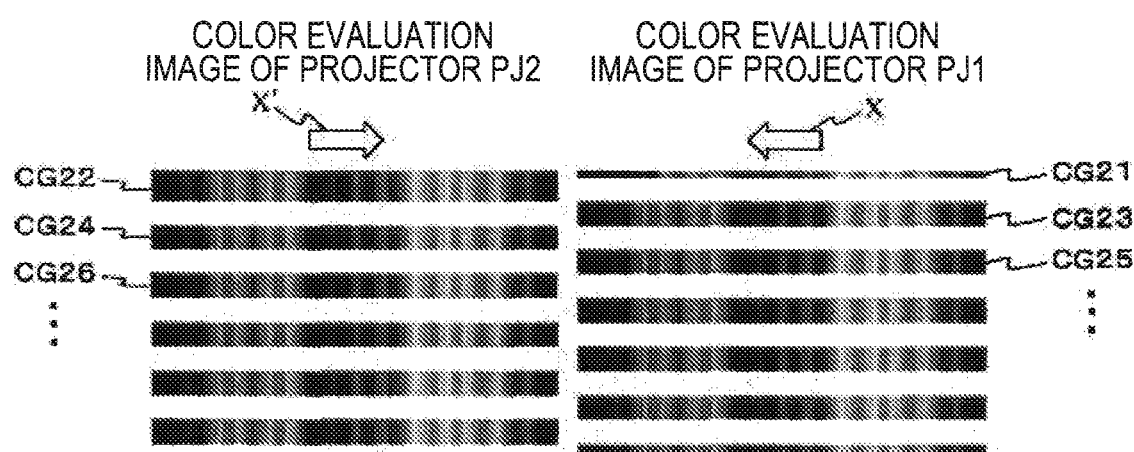
FIG. 14 is a view showing the projection states of the partial color evaluation images CG21, CG23, CG25, . . . projected from a projector PJ1 and the projection states of the partial color evaluation images CG22, CG24, CG26, . . . projected from a projector PJ2.

FIG. 14A shows the partial color evaluation images CG21, CG23, CG25, . . . and the partial color evaluation images CG22, CG24, CG26, . . . projected onto the screen SCR by the projectors PJ1 and PJ2. FIG. 14A shows an example of arranging the partial color evaluation images CG21, CG23, CG25, . . . and the partial color evaluation images CG22, CG24, CG26, . . . projected from the projectors PJ1 and PJ2 in the horizontal direction, unlike FIG. 12.

Figure 14B:
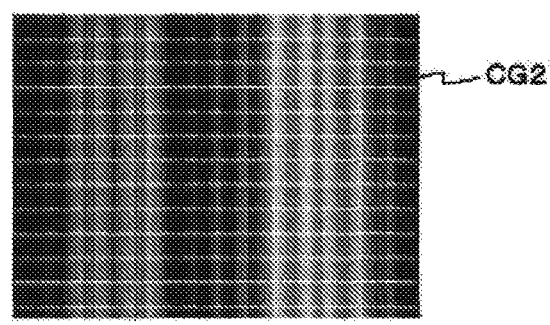

By moving the partial color evaluation images CG21, CG23, CG25, . . . and the partial color evaluation images CG22, CG24, CG26, . . . from the state of FIG. 14A in directions denoted by arrows X and X', one screen is formed as shown in FIG. 14B. By forming the screen by the partial color evaluation images from the two projectors PJ1 and PJ2 as shown in FIG. 14B, the color evaluation image CG2 shown in FIG. 12 is formed.

The state of FIG. 14B is picked up by the image pickup device 11 and the picked-up image data is sent to the color evaluating device 12. By performing the subsequent processes similar to those of the second embodiment, it is possible to perform the color adjustment for color matching of the projected images from the two projectors.

As described above, according to the third embodiment, when the projected images from the plurality of projectors are projected through stacking, among the projectors PJ1 and PJ2 for projecting adjacent projected images, the projector PJ1 projects the partial color evaluation images CG21, CG23, CG25 shown in FIG. 14A, . . . and the projector PJ2 projects the partial color evaluation images CG22, CG24, CG26, . . . to form the color evaluation image CG2 shown in FIG. 14B on the screen SCR.

The color evaluation image CG2 shown in FIG. 14B is equal to the color evaluation image CG2 shown in FIG. 12. Accordingly, it is possible to efficiently obtain the evaluating result of many colors with high precision only by displaying the stripe-shaped partial color evaluation image from the two projectors PJ1 and PJ2 once. Since the color evaluation image CG2 formed by the partial color evaluation images has the arrangement in which color regions having similar colors are adjacent to each other, it is possible to satisfy the condition that the signal values of the adjacent pixels are not significantly different from each other.

Fourth Embodiment

Although the example where the color evaluation image data is stored in the color evaluation image data storing unit 122 of the color evaluating device 12 is described in the first to third embodiments, the color evaluation image data may be generated using a color evaluation image data generating program for generating the color evaluation image data, instead of storing the color evaluation image data.

Figure 15:
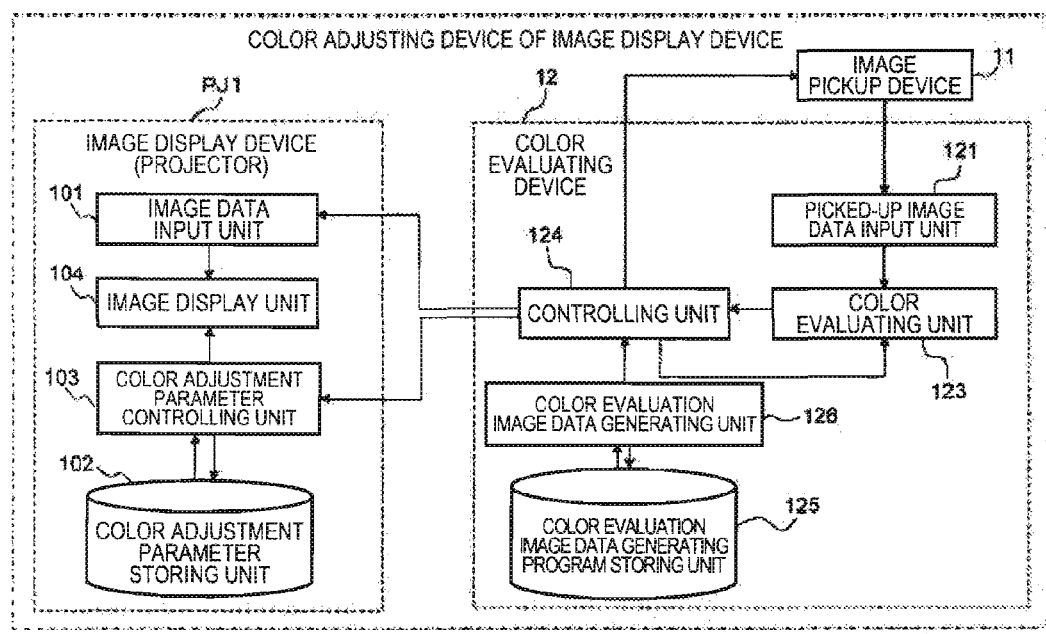
FIG. 15 is a view showing a projector PJ1 and a color evaluating device 12 according to a fourth embodiment of the invention in detail.

FIG. 15 is a view showing a projector PJ1 and a color evaluating device 12 according to a fourth embodiment of the invention in detail. In FIG. 15, one projector is shown, similar to FIG. 2.

FIG. 15 is different from FIG. 2 in that the color evaluating device 12 has a color evaluation image data generating program storing unit 125 for storing a color evaluation image data generating program for generating the color evaluation image data and a color evaluation image data generating unit 126 for reading the color evaluation image data generating program from the color evaluation image data generating program storing unit 125 and generating the color evaluation image data. The other components are the same as FIG. 2 and thus are denoted by the same reference numerals.

When the color evaluating device 12 has the configuration shown in FIG. 15, in the color evaluating device 12, the color evaluation image data generating unit 126 reads the color evaluation image data generating program from the color evaluation image data generating program storing unit 125, generates the color evaluation image data and sends the color evaluation image data to the projector PJ1. The other operations are similar to those of FIG. 2 and thus their description will be omitted.

The color evaluation image data generating program includes the steps of quantizing an n-dimensional (n is an integer of at least 3) color space and generating color arrangement data corresponding to color arrangement when points in the quantized color space are arranged using a predetermined space-filling curve, and generating the color evaluation image data corresponding to the color evaluation image to have the color arrangement in which adjacent colors in the color arrangement corresponding to the generated color arrangement data are adjacent to each other in at least a portion even in the color evaluation image.

The color arrangement data is obtained by quantizing a three-dimensional color space of RGB, scanning the points in the three-dimensional color space obtained by the quantization in the order of the three-dimensional space-filling curve (for example, a Hilbert curve) and arranging a color coordinate string in the three-dimensional color space of RGB in the scanning order. An example of generating the color arrangement data is shown in FIG. 16. This is an example of arranging and storing the color coordinates of the quantized points in the three-dimensional color space along the Hilbert curve one by one.

The color evaluation image data generating program sets the pixel values of the pixels of the color evaluation image and generates the color evaluation image data such that adjacent colors in the color arrangement corresponding to the color coordinate data, for example, the colors of Q1 and Q2 of FIG. 6 become the colors of adjacent color regions in FIG. 5.

By executing the color evaluation image data generating program by the color evaluation image data generating unit 126, for example, the color evaluation mage data corresponding to the color evaluation image CG1 shown in FIG. 5 may be generated. Similarly, by executing the color evaluation image data generating program by the color evaluation image data generating unit 126, for example, the color evaluation image data corresponding to the color evaluation image CG2 shown in FIG. 12 may be generated in the color evaluation image data generating unit 126.

Although the configuration shown in FIG. 15 uses one projector similar to FIG. 2, this configuration is applicable to a case where a plurality of projectors is used as shown in FIG. 11.

Although the image display device (the projector PJ1, in the fourth embodiment) and the color evaluating device 12 are separately configured in FIG. 15, the image display device and the color evaluating device 12 may be integrally configured. The image pickup device 11 may be further integrally configured. An operation for connecting the color evaluating device 12 or the image pickup device 11 to the image display device is unnecessary and the color adjustment can be simply performed by the integration.

Although the projector is described as the image display device in the fourth embodiment, the invention is not limited to the projector and the other image display device capable of adjusting the colors of image data for each pixel, for example, an image display device having a direct view type display such as a television set, may be used. An image display unit used in the image display device may use a reflection type optical modulating element such as a digital mirror device or a self-emission type organic electroluminescence (organic EL) or plasma display.

Fifth Embodiment

Although the color evaluation image data (the color evaluation image data corresponding to the color evaluation image CG1 or the color evaluation image data corresponding to the color evaluation image CG2) is supplied from the color evaluating device 12 to the projector PJ1 (the projectors PJ1 and PJ2, in the second and third embodiments) in the above-described first to fourth embodiments, the projector may generate and store the color evaluation image data. In the fifth embodiment, an example of providing the color evaluation image data generating program to the projector and generating the color evaluation image data using the color evaluation image data generating program in the projector will be described.

Figure 17:
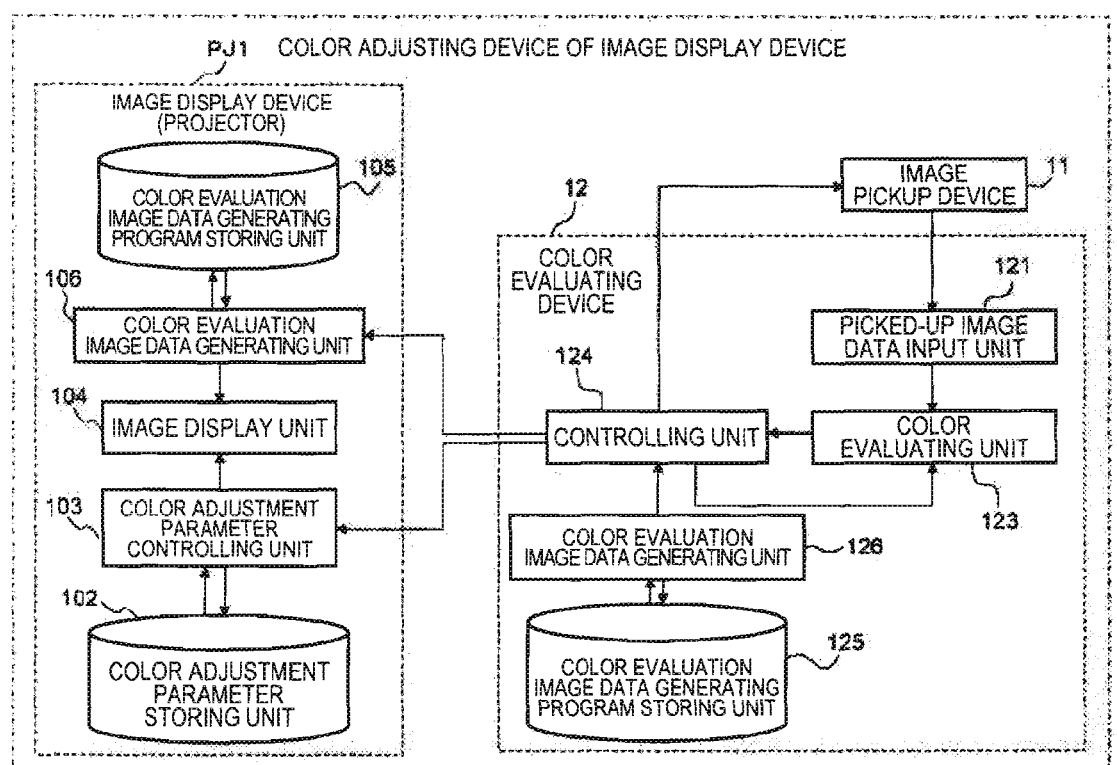
FIG. 17 is a view showing the configuration of a projector PJ1 and a color evaluating device 12 according to a fifth embodiment of the invention in detail.

FIG. 17 is a view showing the configuration of a projector PJ1 and a color evaluating device 12 according to the fifth embodiment of the invention in detail. In FIG. 17, one projector is used, similar to FIG. 2 and the same components as FIG. 2 are denoted by the same reference numerals.

As shown in FIG. 17, the projector PJ1 includes a color evaluation image data generating program storing unit 105 and a color evaluation image data generating unit 106 for generating the color evaluation image data using the color evaluation image generating program stored in the color evaluation image data generating program storing unit 105.

In this case, the color evaluating device 12 also includes a color evaluation image data generating program storing unit 125 and a color evaluation image data generating unit 126, similar to FIG. 15. This is because the projector PJ1 must recognize which color evaluation image is displayed when the color evaluation is performed by the color evaluating unit 123. Accordingly, the color evaluation image data displayed by the projector PJ1 is also supplied to the color evaluating unit 123.

In the case of having the configuration shown in FIG. 17, when the color evaluating device 12 performs the color evaluation, a color evaluation image display instruction for displaying the color evaluation image is supplied from the controlling unit 124 of the color evaluating device 12 to the projector PJ1. By supplying the color evaluation image display instruction to the projector PJ1, in the projector PJ1, the color evaluation image data generating unit 106 reads the color evaluation image data generating program from the color evaluation image data generating program storing unit 105 and generates the color evaluation image data, and the image display unit 104 receives the generated color evaluation image data and displays the color evaluation image on the screen. The subsequent operations may be performed similar to the above-described embodiments.

Although the example that the projector PJ1 has the color evaluation image data generating program for generating the color evaluation image data and generates the color evaluation image data using the color evaluation image data generating program is described in FIG. 17, the color evaluation image data may be stored in the projector PJ1, instead of generating the color evaluation image data using the color evaluation image data generating program. In this case, it is preferable that the color evaluation image data storing unit (not shown) is provided in the projector PJ1 and the color evaluation image data is read from the color evaluation image data storing unit and displayed on the screen by the image display unit 104.

Although one projector is used in FIG. 17, similar to FIG. 2, as shown in FIG. 11, a plurality of projectors may be used. In this case, the color evaluation image data generating program storing unit 105 and the color evaluation image data generating unit 106 are provided in the respective projectors.

Although the projector is described as the image display device in the fifth embodiment, the invention is not limited to the projector and the other image display device capable of adjusting the colors of image data for each pixel, for example, an image display device having a direct view type display such as a television set, may be used. An image display unit used in the image display device may use a reflection type optical modulating element such as a digital mirror device or a self-emission type organic electroluminescence (organic EL) or plasma display.

The invention is not limited to the above-described embodiments and may be variously changed without departing from the spirit of the invention. Although the example of using the Hilbert curve as the fractal curve is described in the above-described embodiments, a Peano curve may be used instead of the Hilbert curve.

Although the example of using the three-dimensional color space of RGB is described in the above-described embodiments, the invention is applicable to a multi-dimensional (at least three-dimensional) color space.

Although the color evaluation image CG1 used in the first embodiment includes 4096 colors and the color evaluation images used in the second and third embodiments include 512 colors, the number of the colors of the color evaluation image CG2 is not limited thereto.

Although, in the color evaluation image CG1 used in the first embodiment, the color regions are arranged in the square lattice shape, the arrangement of the color regions is not limited to the square lattice shape and, for example, the color regions are arranged in a triangular lattice shape or a hexagonal lattice shape.

In the invention, the above-described color evaluating program may be generated and recorded in a variety of record media. The invention includes the record medium having the color evaluating program recorded thereon. The color evaluating program may be obtained over a network. The color evaluation image data generating program may be recorded in a variety of record media. The invention includes the record medium having the color evaluation image data generating program recorded thereon. The color evaluation image data generating program may be obtained over the network.

The entire disclosure of Japanese Patent Application Nos: 2005-232869, filed Oct. 11, 2005 and 2006-191081, filed Jun. 12, 2006 are expressly incorporated by reference herein.

What is claimed is:

1. A color evaluating method of an image display device, which evaluates colors displayed by the image display device, comprising:
   displaying an image evaluation image, in which a plurality of color regions corresponding to a pixel or a plurality of pixels of the image display device and each having one of a plurality of colors is included and, among the plurality of color regions, at least one color region and at least one other color region having a color similar to that of the one color region are arranged to be adjacent to each other, on the image display device;
   evaluating the colors displayed by the image display device based on picked-up image data obtained by picking up the color evaluation image displayed by the image display device, wherein the color evaluation image has a color arrangement in which the plurality of color regions are arranged in a belt shape, long sides of the belt-shaped color regions are arranged to be adjacent to one another and, among the plurality of color regions, in at least a given color region except a color region located at an end of the color evaluation image, two color regions adjacent to the given color region have colors similar to that of the given color region;
   generating color adjustment parameter correcting data based on the evaluation; and
   correcting color adjustment parameters based on the generated color adjustment parameter correcting data.

2. The image evaluating method of the image display device according to claim 1, wherein the color of the given color region is the color of a predetermined point among points in a color space obtained by quantizing an n-dimensional (n is an integer of at least 3) color space, and
   wherein the similar colors are the colors of points adjacent to the predetermined point in the color arrangement when the points in the color space are arranged in a predetermined space-filling curve.

3. The image evaluating method of the image display device according to claim 2, wherein the predetermined space-filling curve is a fractal curve.

4. The image evaluating method of the image display device according to claim 3, wherein the fractal curve is a Hilbert curve.

5. The image evaluating method of the image display device according to claim 1, wherein the evaluating of the color includes comparing color evaluation image data corresponding to the color evaluation image with the picked-up image data to evaluate the colors displayed by the image display device.

6. The image evaluating method of the image display device according to claim 1, further comprising generating color adjustment parameter correcting data for correcting a color adjustment parameter used when performing color adjustment in the image display device, based on the evaluating result.

7. A computer-readable medium including a color evaluating program of an image display device, for evaluating colors displayed by the image display device using a color evaluating device, the color evaluating program allowing the color evaluating device to perform the following functions of:
   displaying an image evaluation image, in which a plurality of color regions corresponding to a pixel or a plurality of pixels of the image display device and each having one of a plurality of colors is included and, among the plurality of color regions, at least one color region and at least one other color region having a color similar to that of the one color region are arranged to be adjacent to each other, on the image display device;
   evaluating the colors displayed by the image display device based on picked-up image data obtained by picking up the color evaluation image displayed by the image display device, wherein the color evaluation image has a color arrangement in which the plurality of color regions are arranged in a belt shape, long sides of the belt-shaped color regions are arranged to be adjacent to one another and, among the plurality of color regions, in at least a given color region except a color region located at an end of the color evaluation image, two color regions adjacent to the given color region have colors similar to that of the given color region;
   generating color adjustment parameter correcting data based on the evaluation; and
   correcting color adjustment parameters based on the generated color adjustment parameter correcting data.

8. A color evaluating device of an image display device, for evaluating colors displayed by the image display device, comprising:
   a controlling unit which displays an image evaluation image, in which a plurality of color regions corresponding to a pixel or a plurality of pixels of the image display device and each having one of a plurality of colors is included and, among the plurality of color regions, at least one color region and at least one other color region having a color similar to that of the one color region are arranged to be adjacent to each other, on the image display device;

a color evaluating unit which evaluates the colors displayed by the image display device based on picked-up image data obtained by picking up the color evaluation image displayed by the image display device and generates color adjustment parameter correcting data based on the evaluation, wherein the color evaluation image has a color arrangement in which the plurality of color regions are arranged in a belt shape, long sides of the belt-shaped color regions are arranged to be adjacent to one another and, among the plurality of color regions, in at least a given color region except a color region located at an end of the color evaluation image, two color regions adjacent to the given color region have colors similar to that of the given color region; and a color adjustment parameter controlling unit which corrects color adjustment parameters based on the generated color adjustment parameter correcting data.

9. The color evaluating device of the image display device according to claim 8, wherein the controlling unit displays the color evaluation image on the image display device based on color evaluation image data stored in the color evaluating device.

10. The color evaluating device of the image display device according to claim 8, wherein the controlling unit displays the color evaluation image on the image display device based on color evaluation image data stored in the image display device.

* * * * *